United States Patent
Banno et al.

(10) Patent No.: US 9,343,995 B2
(45) Date of Patent: May 17, 2016

(54) POWER CONVERSION DEVICE

(71) Applicant: FUJI ELECTRIC CO., LTD., Kawasaki-shi (JP)

(72) Inventors: Seitaro Banno, Hachioji (JP); Satoru Fujita, Akishima (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/591,535

(22) Filed: Jan. 7, 2015

(65) Prior Publication Data
US 2015/0124498 A1  May 7, 2015

Related U.S. Application Data

(63) Continuation of application No. PCT/JP2013/000474, filed on Jan. 30, 2013.

(51) Int. Cl.
  *H02M 1/12*   (2006.01)
  *H02M 7/04*   (2006.01)
  *H02M 5/458*  (2006.01)
  *H02M 1/32*   (2007.01)

(52) U.S. Cl.
  CPC ............... *H02M 7/04* (2013.01); *H02M 1/126* (2013.01); *H02M 5/458* (2013.01); *H02M 2001/325* (2013.01)

(58) Field of Classification Search
  CPC ....... H02M 1/126; H02M 5/458; H02M 7/04; H02M 2001/325; H02J 9/062
  See application file for complete search history.

(56) References Cited

U.S. PATENT DOCUMENTS

| | | | | |
|---|---|---|---|---|
| 7,605,570 B2 * | 10/2009 | Liu | ..................... | H02M 1/4208 323/207 |
| 7,782,643 B2 | 8/2010 | Hara et al. | | |
| 7,834,597 B1 * | 11/2010 | Shekhawat | .............. | H02M 1/32 323/224 |
| 2013/0235625 A1 | 9/2013 | Yamada | | |
| 2014/0268970 A1 * | 9/2014 | Tanaka | .................. | H02M 5/297 363/163 |
| 2014/0362626 A1 * | 12/2014 | Kidera | ................ | H01L 27/0605 363/131 |

FOREIGN PATENT DOCUMENTS

WO  WO-2006/112275 A1  10/2006
WO  WO-2012/067167 A1  5/2012

* cited by examiner

*Primary Examiner* — Matthew Nguyen
(74) *Attorney, Agent, or Firm* — Rabin & Berdo, P.C.

(57) ABSTRACT

A power converter includes a first arm configured by connecting a diode to a switching element, a second arm configured by connecting a diode to another switching element, a third arm formed of a first bidirectional switch configured by connecting switch elements, and a fourth arm formed of a second bidirectional switch configured by connecting other switch elements. An inverter circuit is configured by connecting the first and second arms in series between terminals of a direct current power source circuit, by connecting the third arm between a terminal of an alternating current power source and an output terminal, and by connecting the fourth arm between the output terminal and another output terminal. The control mode of the inverter circuit is switched between control modes at a timing at which at least one common arm continues a conductible condition.

20 Claims, 16 Drawing Sheets

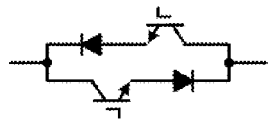

FIG. 2A

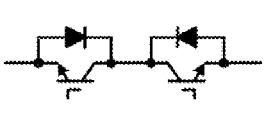

FIG. 2B

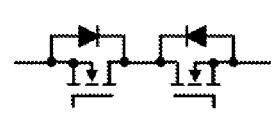

FIG. 2C

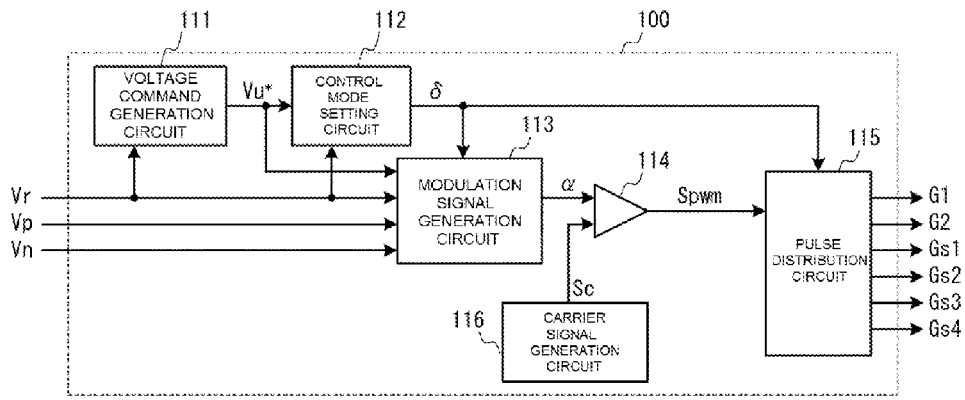

FIG. 3

| VOLTAGE COMMAND (Vu*) | ALTERNATING CURRENT POWER SOURCE VOLTAGE (Vr) | COMPARISON OF Vr AND Vu* | CONTROL MODE SIGNAL (δ) | CONTROL SIGNAL | | | | | | α (MODULATION SIGNAL) |
|---|---|---|---|---|---|---|---|---|---|---|
| | | | | G1 | G2 | Gs1 | Gs2 | Gs3 | Gs4 | |
| Vu* ≧ Vz | Vr ≦ Vz | — | CM1 | Hon | L | L | L | H | Lon | Vu* / Vp |
| | Vr > Vz | Vu* > Vr | CM2 | Hon | L | H | Lon | L | L | (Vu*−Vr) / (Vp−Vr) |
| | | Vu* ≦ Vr | CM3 | L | L | Hon | H | H | Lon | Vu* / Vr |
| Vu* < Vz | Vr < Vz | Vu* ≧ Vr | CM4 | L | L | H | Hon | Lon | H | Vu* / Vr |
| | | Vu* < Vr | CM5 | L | Hon | Lon | H | L | L | (Vu*−Vr) / (Vn−Vr) |
| | Vr ≧ Vz | — | CM6 | L | Hon | L | L | Lon | H | Vu* / Vn |
| \|Vu*−Vr\| < ΔVu* | | | CM7 | L | L | H | H | L | L | 1.0 (100%) |

FIG. 4

POWER CONVERSION DEVICE

This application is a continuation under 35 U.S.C. 120 of International Application PCT/JP2013/000474 having the International Filing Date of Jan. 30, 2013. The identified application is fully incorporated herein by reference.

BACKGROUND

1. Technical Field

The present invention relates to a power conversion device which can supply a stable voltage to a load even though the voltage of an alternating current power source fluctuates.

2. Background Art

FIG. 18 is a diagram for illustrating a form of a power conversion device disclosed in PTL 1 (identified further on). The power conversion device converts the voltage of an alternating current power source to a direct current voltage once, converts the converted direct current voltage to a predetermined alternating current voltage again, and supplies the predetermined alternating current voltage to a load. In FIG. 18, 1 is a single-phase alternating current power source, 2 a capacitor, 3 a direct current power source circuit, 4 an inverter circuit, 5 a filter circuit, and 6 a load. The alternating current power source 1 includes a power source terminal R and a power source terminal S as terminals which output the alternating current voltage. Hereafter, the power source terminal R will be referred to as the terminal R, and the power source terminal S will be referred to as the terminal S. The capacitor 2 is connected between the terminal R and terminal S of the alternating current power source 1.

The direct current power source circuit 3 is formed of capacitors Cp and Cn, switching elements Qp and Qn, and a reactor Lr. The capacitors Cp and Cn are connected in series. The connection point of the capacitors Cp and Cn, as well as being connected to the terminal S of the alternating current power source 1, is connected to a neutral point terminal O of the direct current power source circuit 3. The switching elements Qp and Qn are connected in series. The series circuit of the switching elements Qp and Qn is connected in parallel to the series circuit of the capacitors Cp and Cn. The reactor Lr is connected between the terminal R of the alternating current power source 1 and the connection point of the switching elements Qp and Qn.

By the switching elements Qp and Qn being turned on and off, the capacitors Cp and Cn are charged to an equal voltage using the voltage of the alternating current power source 1. The voltage of the charged capacitors Cp and Cn is a voltage higher than the amplitude of the alternating current voltage output from the alternating current power source 1. Further, the direct current power source circuit 3 outputs the positive voltage of the capacitor Cp from a positive side terminal P, and outputs the negative voltage of the capacitor Cn from a negative side terminal N, with the neutral point terminal O as a reference.

The inverter circuit 4 is configured of the series circuit of switching elements Q1 and Q2 connected in series and bidirectional switches BS1 and BS2. Diodes are connected in reverse parallel to the respective switching elements Q1 and Q2. The connection point of the switching elements Q1 and Q2 is connected to one output terminal U of the inverter circuit 4. The other output terminal V of the inverter circuit 4 is connected to the neutral point terminal O. The series circuit of the switching elements Q1 and Q2 is connected between the positive side terminal P and negative side terminal N of the direct current power source circuit 3. The bidirectional switch BS1 is connected between the terminal R of the alternating current power source 1 and the output terminal U. The bidirectional switch BS2 is connected between the neutral point terminal O and the output terminal U.

The inverter circuit 4 selectively turns on and off the switching elements Q1 and Q2 and the bidirectional switches BS1 and BS2. By this operation, a predetermined alternating current voltage is output between the output terminal U and the output terminal V. Hereafter, "between the output terminal U and the output terminal V" will be referred to as "between the output terminals U and V". The alternating current voltage output between the output terminals U and V is a pulse-width modulated pulse train voltage.

The filter circuit 5 is configured by connecting a reactor Lf1 and a capacitor Cf1 in series. The filter circuit 5 is connected between the output terminals U and V of the inverter circuit 4. The load 6 is connected across the capacitor Cf1.

The filter circuit 5 removes a high frequency component from the alternating current pulse train voltage output by the inverter circuit 4. Consequently, a sinusoidal alternating current voltage is supplied to the load 6.

PTL 1 discloses a technology wherein the power conversion device outputs a predetermined voltage lower than the voltage of the alternating current power source 1. The power conversion device, by alternately turning on and off the bidirectional switches BS1 and BS2, outputs a predetermined voltage, which is lower than the voltage of the alternating current power source 1, between the output terminals U and V. Also, the power conversion device can output a predetermined voltage higher than the voltage of the alternating current power source 1. The power conversion device, by selectively turning on and off the switching elements Q1 and Q2 and the bidirectional switch BS1, outputs a predetermined voltage, higher than the voltage of the alternating current power source 1, between the output terminals U and V.

CITATION LIST

Patent Literature

PTL 1: WO2012/067167

The power conversion device shown in FIG. 18 alternately turns on and off two elements with each dead time sandwiched in-between. The dead times are provided to prevent both elements from being turned on at the same time. However, when the dead time exists when a combination of elements, which are alternately turned on and off, switches, the path of a current flowing through the reactor Lf1 is lost. When the path of a current flowing through the reactor Lf1 is lost, there arises the problem that a surge voltage appears across the reactor Lf1. The surge voltage causes a breakdown of the elements included in the inverter circuit 4 or damage to the load.

SUMMARY

The invention has been contrived in order to solve this kind of problem which the heretofore known technology has. That is, an object of the invention is to, even when the control mode of an inverter circuit switches, secure the path of a current flowing through an inductance component existing between the output terminals of the power conversion device. Further, another object is to suppress a surge voltage, which appears across the inductance component, by securing the path of a current flowing through the inductance component.

In order to achieve the heretofore described objects, an aspect of the form of the invention is a power conversion device including a power converter which has first to fourth input terminals; first and second output terminals; and first to fourth arms connected between the respective first to fourth input terminals and the first output terminal. The power converter of the power conversion device operates in a control mode which alternately turns on and off two arms selected from among the first to fourth arms. Further, the power converter has two or more control modes set by combining different arms. Furthermore, the power converter, when switching its operation from one control mode to another control mode, carries out the control mode switching at a timing at which at least one common arm continues a bidirectionally conductible condition before and after the switching.

Advantageous Effects of Invention

The power conversion device according to the invention carries out the control mode switching at a timing at which at least one common arm is in a bidirectionally conductible condition before and after the switching. By so doing, the power conversion device can secure the path of a current flowing through an inductance component existing between the output terminals of the power converter. Consequently, the power conversion device can suppress a surge voltage appearing across the inductance component existing between the output terminals of the power converter.

BRIEF DESCRIPTION OF THE DRAWINGS

FIGS. 2A, 2B and 2C show diagrams for illustrating embodiments of a bidirectional switch.

FIG. 3 is a block diagram for illustrating a configuration example of a control circuit.

FIG. 4 is a chart for illustrating a relationship between a control mode and a control signal of each element.

DETAILED DESCRIPTION

Figure 1:
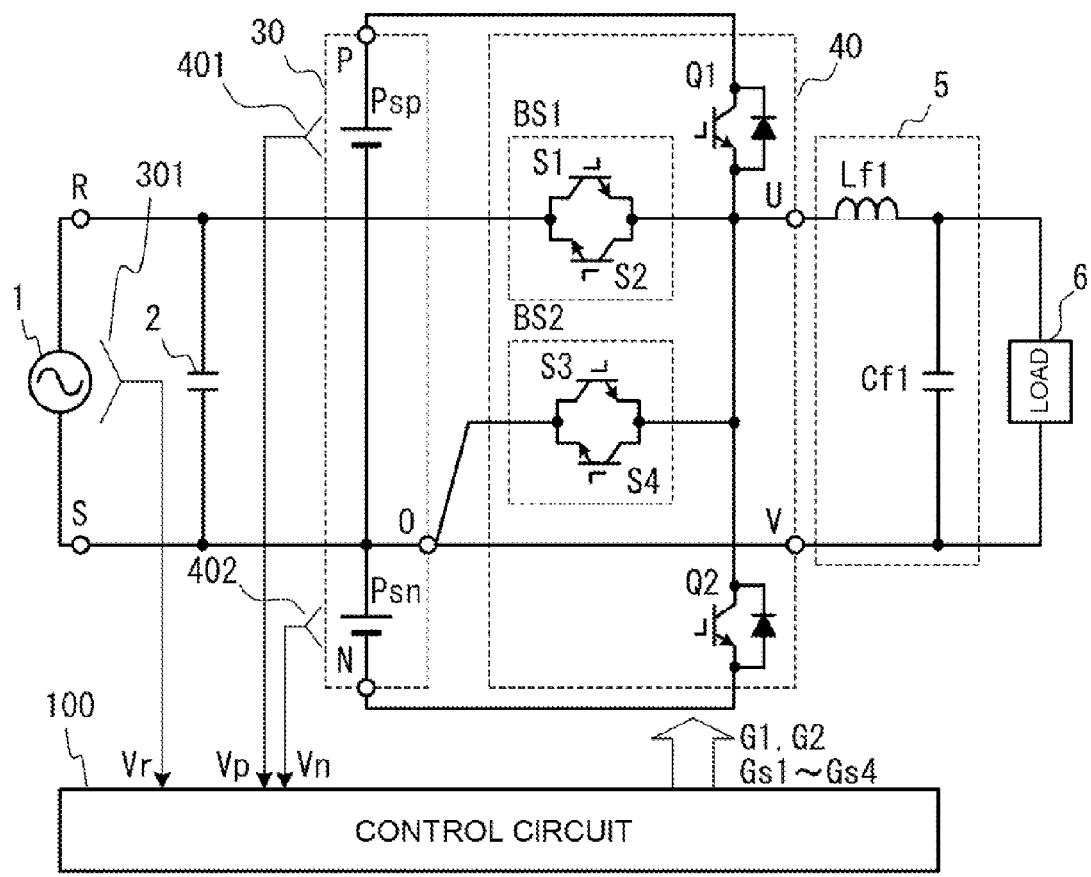
FIG. 1 is a diagram for illustrating a configuration example of a power conversion device according to the invention.
Figure 18:
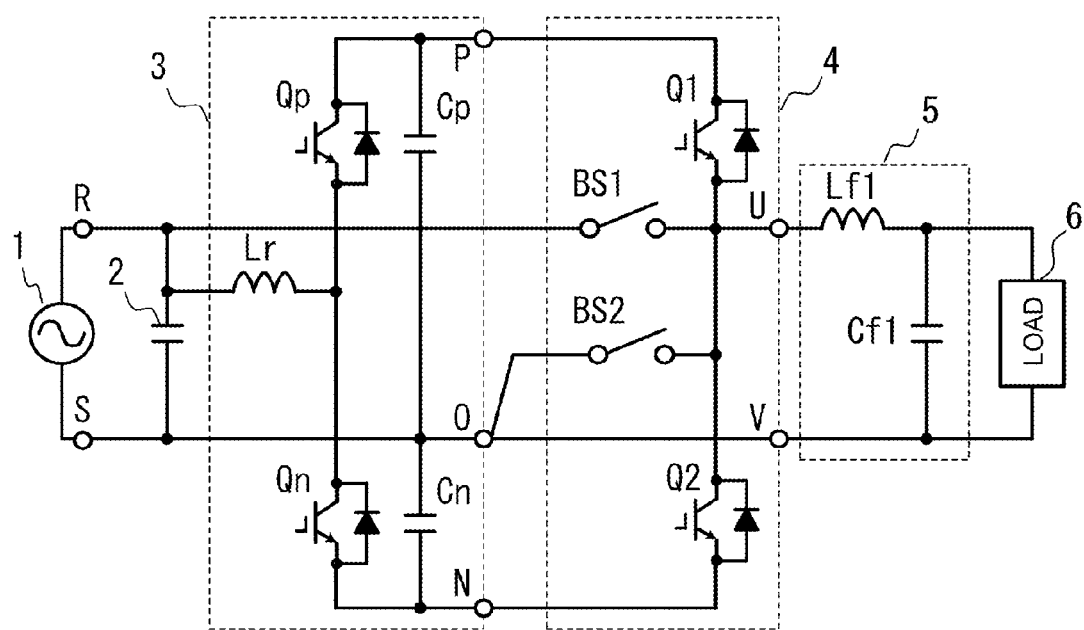
FIG. 18 is a diagram for illustrating a configuration of a power conversion device according to a heretofore known technology.

Hereafter, a description will be given of an embodiment of the invention. FIG. 1 is a diagram for illustrating a configuration example of a power conversion device according to the invention. In FIG. 1, 1 is an alternating current power source, 2 a capacitor, 30 a direct current power source circuit, 40 an inverter circuit, 5 a filter circuit, 6 a load, and 100 a control circuit. The alternating current power source 1 is a single-phase alternating current power source having a power source terminal R and a power source terminal S. Hereafter, the power source terminal R will be referred to as the terminal R. Also, the power source terminal S will be referred to as the terminal S. A positive side terminal P, negative side terminal N, and neutral point terminal O of the direct current power source circuit 30 shown in FIG. 1 correspond respectively to a positive side terminal P, negative side terminal N, and neutral point terminal O of a direct current power source circuit 3 shown in FIG. 18.

The direct current power source circuit 30 is a power source circuit configured by connecting a positive side direct current power source Psp (a first direct current power source) and a negative side direct current power source Psn (a second direct current power source) in series. The size of a positive voltage Vp of the positive side direct current power source Psp and the size of a negative voltage Vn of the negative side direct current power source Psn are set so as to be larger than the amplitude of an alternating current voltage output from the alternating current power source 1. The direct current power source circuit 30 can be realized by a direct current power source circuit 3 shown in FIG. 18 or a circuit having the equivalent function. The neutral point terminal O of the direct current power source circuit 30 is a terminal which outputs a midpoint potential (a zero voltage Vz) of the direct current power source circuit 30. The terminal S of the alternating current power source 1 is connected to the neutral point terminal O of the direct current power source circuit 30. That is, the neutral point terminal O is the reference potential point of the alternating current power source 1 and direct current power source circuit 30.

Hereafter, the voltage of each terminal will be expressed by a potential with the potential of the neutral point terminal O as a reference. Consequently, the positive side terminal P of the direct current power source circuit 30 outputs the positive voltage Vp of the direct current power source Psp. The negative side terminal N of the direct current power source circuit 30 outputs the negative voltage Vn of the direct current power source Psn. The terminal R of the alternating current power source 1 outputs a voltage Vr of the alternating current power source 1.

The inverter circuit 40, using four level voltages, the positive voltage Vp, the negative voltage Vn, the zero voltage Vz, and the voltage Vr of the alternating current power source 1, outputs a single-phase alternating current voltage Vuv between output terminals U and V. The alternating current voltage output between the output terminals U and V is a pulsed voltage pulse-width modulated based on a voltage command Vu*. The configuration and operation of the inverter circuit 40 are as follows.

The inverter circuit 40 is configured of a switching element series circuit, a first bidirectional switch BS1, and a second bidirectional switch BS2. The switching element series circuit is a circuit wherein switching elements Q1 and Q2 are connected in series. The switching element Q1 and a diode connected in reverse parallel thereto configure a first arm. The switching element Q2 and a diode connected in reverse parallel thereto configure a second arm. The first bidirectional switch BS1, being a circuit wherein switch elements S1 and S2 are connected in reverse parallel, configures a third arm.

The second bidirectional switch BS2, being a circuit wherein switch elements S3 and S4 are connected in reverse parallel, configures a fourth arm.

The switching elements Q1 and Q2 and the first to fourth switch elements S1 to S4 perform an on/off operation in accordance with respective control signals G1, G2, and Gs1 to Gs4.

Consequently, the switching elements Q1 and Q2 can perform a unidirectional on/off operation based on the respective control signals. Also, the switching elements Q1 and Q2, regardless of the condition of the respective control signals, can conduct in a direction from the anode to the cathode of each respective diode. That is, the first and second arms can control the conduction in one direction, but can always conduct in the other direction.

The switch elements S1 and S2 are turned on and off in accordance with the respective control signals. Also, the switch elements S3 and S4 are turned on and off in accordance with the respective control signals. Consequently, the first bidirectional switch BS1 (third arm) can conduct unidirectionally or bidirectionally. Also, the second bidirectional switch BS2 (fourth arm) can conduct unidirectionally or bidirectionally.

An example of the method of generating the control signals G1 and G2 and the control signals Gs1 to Gs4 will be described hereafter.

The switching element series circuit is connected between the positive side terminal P and negative side terminal N of the direct current power source circuit 30. The series connection point of the switching elements Q1 and Q2 is connected to the output terminal U (a first output terminal). The output terminal V (a second output terminal) is connected to the neutral point terminal O.

The first bidirectional switch is connected between the output terminal U and the terminal R. Further, the collector terminal side of the switch element S1 of the first bidirectional switch is connected to the terminal R. The emitter terminal side of the switch element S1 is connected to the output terminal U. Also, the second bidirectional switch is connected between the output terminal U and the neutral point terminal O. Further, the collector terminal side of the switch element S4 of the second bidirectional switch is connected to the output terminal U. The emitter terminal side of the switch element S4 is connected to the neutral point terminal O.

The output terminals U and V are connected to the load 6 via the filter circuit 5. The filter circuit 5 is configured of the series circuit of a reactor Lf1 and capacitor Cf1. The load 6 is connected across the capacitor Cf1.

Herein, the switching elements Q1 and Q2 are IGBTs (Insulated Gate Bipolar Transistors) to which the respective diodes are connected in reverse parallel. However, the switching elements Q1 and Q2 are not limited to this kind of configuration. The switching elements Q1 and Q2 may be configured using another semiconductor element, such as a MOSFET (Metal Oxide Semiconductor Field Effect Transistor), which can perform an on/off operation at a frequency higher enough than the frequency of the alternating current power source 1.

Also, the first and second bidirectional switches are each a circuit configured by connecting two reverse blocking IGBTs in reverse parallel. This bidirectional switch can cause a current to flow in one direction by turning on one switch element, and can cause a current to flow in the other direction by turning on the other switch element. Also, the bidirectional switch can cause a current to flow in both directions by turning on both switch elements.

The bidirectional switch may be a circuit formed of the configuration shown in each of FIGS. 2A, 2B and 2C, a circuit having the equivalent function and advantage. FIG. 2A shows a circuit wherein two circuits, in each of which an IGBT having no reverse blocking breakdown voltage and a diode are connected in series, are connected in reverse parallel. FIG. 2B shows a circuit configured by connecting two circuits, in each of which a diode is connected in reverse parallel to an IGBT having no reverse blocking breakdown voltage, in reverse series. FIG. 2C shows a circuit configured by replacing the IGBTs with MOSFETs in the circuit of FIG. 2B.

In the heretofore described configuration of the inverter circuit 40, by the switching element Q1 conducting, the positive voltage Vp of the direct current power source circuit 30 is output to the output terminal U. Also, by the diode connected in reverse parallel to the switching element Q1 conducting too, the positive voltage Vp of the direct current power source circuit 30 is output to the output terminal U.

By the switching element Q2 conducting, the negative voltage Vn of the direct current power source circuit 30 is output to the output terminal U. Also, by the diode connected in reverse parallel to the switching element Q2 conducting too, the negative voltage Vn of the direct current power source circuit 30 is output to the output terminal U.

By one of the switch elements S1 and S2 conducting, the voltage Vr of the alternating current power source 1 is output to the output terminal U. Also, by one of the switch elements S3 and S4 conducting, the zero voltage Vz of the neutral point terminal O is output to the output terminal U.

The inverter circuit 40, based on the control signals generated in the control circuit 100, selectively turns on and off the switching elements Q1 and Q2 and switch elements S1 to S4. By this on/off operation, the inverter circuit 40 outputs a voltage Vu corresponding to the voltage command Vu* between the output terminals U and V. The voltage command Vu* is a voltage command having the frequency and amplitude of an alternating current voltage which should be supplied to the load 6.

The voltage Vu output from the inverter circuit 40 is pulse-width modulated and includes a large number of harmonic components. The alternating current voltage Vu output from the inverter circuit 40, after the harmonic components are removed therefrom by the filter circuit 5, is supplied to the load 6.

Next, a description will be given of an operation wherein the control circuit 100 generates each control signal. The voltage Vr of the alternating current power source 1, the positive voltage Vp of the direct current power source circuit 30, and the negative voltage Vn of the direct current power source circuit 30 are input into the control circuit 100. The voltage Vr of the alternating current power source 1 is detected by a voltage detector 301. The positive voltage Vp is detected by a voltage detector 401. The negative voltage Vn is detected by a voltage detector 402.

The control circuit 100 generates the control signals G1 and G2 and the control signals Gs1 to Gs4 for turning on and off the switching elements Q1 and Q2 and the switch elements S1 to S4, in each control cycle, using the input voltages, the zero voltage Vz, and the voltage command Vu*.

The control cycle corresponds to a cycle of a carrier signal Sc to be described hereafter. An on/off frequency (a switching frequency) of each element fixed by the control cycle is preferably a frequency higher enough than the frequency of the voltage command Vu*. For example, when the frequency of the voltage command Vu* is a commercial frequency, the switching frequency is preferably 1 kHz or more. Also, the control cycle does not always have to be synchronous with the voltage command Vu*, and may be asynchronous.

FIG. 3 is a diagram for illustrating an operation wherein the control circuit 100 generates each control signal. The control circuit 100 is configured mainly of a voltage command generation circuit 111, a control mode setting circuit 112, a modulation signal generation circuit 113, a comparison circuit 114, a pulse distribution circuit 115 and a carrier signal generation circuit 116. The circuits configuring the control circuit 100 carry out their respective computing operations in each control cycle to be described hereafter.

Firstly, the voltage Vr of the alternating current power source 1 is input into the voltage command generation circuit 111. When the voltage Vr of the alternating current power source 1 is equal to or more than a predetermined value, the voltage command generation circuit 111 assumes that the alternating current power source 1 is in a good condition. Further, the voltage command generation circuit 111 generates the voltage command Vu* based on the voltage Vr of the alternating current power source 1. The voltage command Vu* is a voltage command which is synchronous with the voltage Vr of the alternating current power source 1 and has an amplitude equal to that of a rated input voltage of the load 6. Meanwhile, when the voltage Vr of the alternating current power source 1 is less than the predetermined value, the voltage command generation circuit 111 assumes that the alternating current power source 1 is interrupted. Further, the voltage command generation circuit 111 generates the voltage command Vu* having an amplitude which is of a predetermined frequency and equal to that of the rated input voltage of the load 6.

The voltage command Vu* can also be made a voltage command which is asynchronous with the voltage Vr of the alternating current power source 1. Also, the voltage command Vu* can also be made a voltage command having an amplitude different from that of the rated input voltage of the load 6.

The voltage command Vu* generated in the voltage command generation circuit 111, together with the voltage Vr of the alternating current power source 1, is input into the control mode setting circuit 112.

The control mode setting circuit 112 determines an operation mode of the inverter circuit 40 using the voltage command Vu* and the voltage Vr of the alternating current power source 1. The operation mode of the inverter circuit 40 includes first to fourth operation modes. The first operation mode is a mode in which to output a predetermined voltage higher than the voltage Vr of the alternating current power source 1. The second operation mode is a mode in which to output a predetermined voltage lower than the voltage Vr of the alternating current power source 1. The third operation mode is a mode in which to output the voltage Vr of the alternating current power source 1. The fourth operation mode is a mode in which to output a predetermined voltage using the voltage of the direct current power source circuit 30.

Next, the control mode setting circuit 112 outputs a control mode signal δ for issuing a command for an operation in an appropriate control cycle. The control mode signal δ of the inverter circuit 40 includes a first control mode to a seventh control mode.

FIG. 4 shows conditions for control mode settings which are carried out by the control mode setting circuit 112. When the relationship between the voltage command Vu* and the voltage Vr of the alternating current power source 1 in a control cycle is Vu*≥Vz and Vr≤Vz, the control mode in the control cycle is set to the first control mode CM1. When the relationship between the voltage command Vu* and the voltage Vr of the alternating current power source 1 in a control cycle is Vu*≥Vz, Vr>Vz, and Vu*>Vr, the control mode in the control cycle is set to the second control mode CM2. When the relationship between the voltage command Vu* and the voltage Vr of the alternating current power source 1 in a control cycle is Vu*≥Vz, Vr>Vz, and Vu*≤Vr, the control mode in the control cycle is set to the third control mode CM3. When the relationship between the voltage command Vu* and the voltage Vr of the alternating current power source 1 in a control cycle is Vu*<Vz, Vr<Vz, and Vu*≥Vr, the control mode in the control cycle is set to the fourth control mode CM4. When the relationship between the voltage command Vu* and the voltage Vr of the alternating current power source 1 in a control cycle is Vu*<Vz, Vr<Vz, and Vu*<Vr, the control mode in the control cycle is set to the fifth control mode CM5. When the relationship between the voltage command Vu* and the voltage Vr of the alternating current power source 1 in a control cycle is Vu*<Vz and Vr≥Vz, the control mode in the control cycle is set to the sixth control mode CM6. When the relationship between the voltage command Vu* and the voltage Vr of the alternating current power source 1 in a control cycle is |Vu*−Vr|<ΔVu*, the control mode in the control cycle is set to the seventh control mode CM7.

The modulation signal generation circuit 113 generates a modulation signal α with the voltage command Vu*, the voltage Vr of the alternating current power source 1, the positive voltage Vp, the negative voltage Vn, and the control mode signal δ as an input. The modulation signals α in the individual control modes are calculated using the following expressions (1) to (7).

[Math. 1]

Modulation signal α in CM1

$$\alpha = Vu^*/Vp \quad (1)$$

Modulation signal α in CM2

$$\alpha = (Vu^* - Vrs)/(Vp - Vrs) \quad (2)$$

Modulation signal α in CM3

$$\alpha = Vu^*/Vrs \quad (3)$$

Modulation signal α in CM4

$$\alpha = Vu^*/Vrs \quad (4)$$

Modulation signal α in CM5

$$\alpha = (Vu^* - Vrs)/(Vn - Vrs) \quad (5)$$

Modulation signal α in CM6

$$\alpha = Vu^*/Vn \quad (6)$$

Modulation signal α in CM7

$$\alpha = 1.0 \quad (7)$$

The carrier signal generation circuit 116 generates the carrier signal Sc. In the embodiment, the carrier signal Sc is of a triangle wave shape. A control cycle in which the computation of the control circuit 100 is carried out is formed of a period from the peak to the trough of the carrier signal Sc and a period from the trough to the peak of the carrier signal Sc.

The comparison circuit 114 compares the modulation signal α and the carrier signal Sc, and generates a pulse-width modulated signal Spwm. Hereafter, the pulse-width modulated signal Spwm will be referred to as the PWM signal Spwm. When the modulation signal α is equal to or higher than the carrier signal Sc, the PWM signal Spwm is High. When the modulation signal α is lower than the carrier signal Sc, the PWM signal Spwm is Low.

The pulse distribution circuit 115, in accordance with the control mode signal δ, selects a first element and a second element from among the switching elements Q1 and Q2 and the switch elements S1 to S2. Also, the pulse distribution circuit 115 generates a control signal Hon of the first element based on the PWM signal Spwm. The control signal Hon switches from Low to High after a dead time Td after the PWM signal Spwm switches from Low to High. Further, the control signal Hon switches from High to Low at the same time as the PWM signal Spwm switches from High to Low. Also, the pulse distribution circuit 115 generates a control signal Lon of the second element based on the PWM signal Spwm. The control signal Lon switches from High to Low at the same time as the PWM signal Spwm switches from Low to High. Further, the control signal Lon switches from Low to High after a dead time Td elapses after the PWM signal Spwm switches from High to Low. That is, the control signal Hon and the control signal Lon are signals which switch alternately between High and Low with each dead time sandwiched inbetween.

When the control signal Hon is High, the first element is turned on (caused to be conducting). Further, when the control signal Hon is Low, the first element is turned off (caused to be non-conducting). In each control cycle, the period in which the first element is turned on is a period based on the modulation signal $\alpha$. Also, when the control signal Lon is High, the second element is turned on (caused to be conducting). Further, when the control signal Lon is Low, the second element is turned off (caused to be non-conducting).

Also, the pulse distribution circuit 115, in accordance with the control mode signal $\delta$, sets the elements, which have not been selected as the first or second element, as an on element or an off element. Further, the pulse distribution circuit 115 sets the control signal for the on element to High. Also, the pulse distribution circuit 115 sets the control signal for the off element to Low. The on element, in accordance with its control signal, is always in an on (conducting) state. The off element, in accordance with its control signal, is always in an off (non-conducting) state.

FIG. 4 shows operations of the switching elements Q1 and Q2 and switch elements S1 to S4 in the individual control modes. The operations of the individual elements are shown by the control signals G1, G2 and Gs1 to Gs4 for controlling the respective elements. The element whose control signal is described as Hon is an element selected as the first element in its control cycle. The element whose control signal is described as Lon is an element selected as the second element in its control cycle. The element whose control signal is described as H is an element set as the on element in its control cycle. The element whose control signal is described as L is an element set as the off element in its control cycle.

Next, a description will be given of operations of the inverter circuit 40 in the individual control modes.

In the first control mode CM1, the switching element Q1 is selected as the first element. Also, the switch element S4 is selected as the second element. Further, the switch element S3 is set as the on element, and the switching element Q2 and the switch elements S1 and S2 are set as the off elements. The switching element Q1 and the switch element S4 are alternately turned on and off with each dead time Td sandwiched in-between. The period in which the switching element Q1 is turned on is a period corresponding to the modulation signal $\alpha$ calculated from the heretofore mentioned expression (1). By this operation, the inverter circuit 40, using the positive voltage Vp, can output an alternating current voltage, which corresponds to the voltage command Vu*, between the output terminals U and V.

In the second control mode CM2, the switching element Q1 is selected as the first element. Also, the switch element S2 is selected as the second element. Further, the switch element S1 is set as the on element, and the switching element Q2 and the switch elements S3 and S4 are set as the off elements. The switching element Q1 and the switch element S2 are alternately turned on and off with each dead time Td sandwiched in-between. The period in which the switching element Q1 is turned on is a period corresponding to the modulation signal $\alpha$ calculated from the heretofore mentioned expression (2). By this operation, the inverter circuit 40, using the positive voltage Vp and the voltage Vr of the alternating current power source 1, can output an alternating current voltage, which corresponds to the voltage command Vu*, between the output terminals U and V.

In the third control mode CM3, the switch element S1 is selected as the first element. Also, the switch element S4 is selected as the second element. Further, the switch elements S2 and S3 are set as the on elements, and the switching elements Q1 and Q2 are set as the off elements. The switch elements S1 and S4 are alternately turned on and off with each dead time Td sandwiched in-between. The period in which the switch element S1 is turned on is a period corresponding to the modulation signal $\alpha$ calculated from the heretofore mentioned expression (3). By this operation, the inverter circuit 40, using the voltage Vr of the alternating current power source 1, can output an alternating current voltage, which corresponds to the voltage command Vu*, between the output terminals U and V.

In the fourth control mode CM4, the switch element S2 is selected as the first element. Also, the switch element S3 is selected as the second element. Further, the switch elements S1 and S4 are set as the on elements, and the switching elements Q1 and Q2 are set as the off elements. The switch elements S2 and S3 are alternately turned on and off with each dead time Td sandwiched in-between. The period in which the switch element S2 is turned on is a period corresponding to the modulation signal $\alpha$ calculated from the heretofore mentioned expression (4). By this operation, the inverter circuit 40, using the voltage Vr of the alternating current power source 1, can output an alternating current voltage, which corresponds to the voltage command Vu*, between the output terminals U and V.

In the fifth control mode CM5, the switching element Q2 is selected as the first element. Also, the switch element S1 is selected as the second element. Further, the switch element S2 is set as the on element, and the switching element Q1 and the switch elements S3 and S4 are set as the off elements. The switching element Q2 and the switch element S1 are alternately turned on and off with each dead time Td sandwiched in-between. The period in which the switching element Q2 is turned on is a period corresponding to the modulation signal $\alpha$ calculated from the heretofore mentioned expression (5). By this operation, the inverter circuit 40, using the negative voltage Vn and the voltage Vr of the alternating current power source 1, can output an alternating current voltage, which corresponds to the voltage command Vu*, between the output terminals U and V.

In the sixth control mode CM6, the switching element Q2 is selected as the first element. Also, the switch element S3 is selected as the second element. Further, the switch element S4 is set as the on element, and the switching element Q1 and the switch elements S1 and S2 are set as the off elements. The switching element Q2 and the switch element S3 are alternately turned on and off with each dead time Td sandwiched in-between. The period in which the switching element Q2 is turned on is a period corresponding to the modulation signal $\alpha$ calculated from the heretofore mentioned expression (6).

By this operation, the inverter circuit 40, using the negative voltage Vn, can output an alternating current voltage, which corresponds to the voltage command Vu*, between the output terminals U and V.

In the seventh control mode CM7, the switch elements S1 and S2 are set as the on elements. Also, the switching elements Q1 and Q2 and the switch element S3 and S4 are set as the off elements. By setting the on elements and off elements in this way, the inverter circuit 40 can output the voltage Vr of the alternating current power source 1 between the output terminals U and V.

Further, the inverter circuit 40, when in the first operation mode, operates in the second control mode CM2 and fifth control mode CM5. That is, the inverter circuit 40 operates in the second control mode CM2 when the voltage command Vu* is equal to or higher than the zero voltage Vz, and operates in the fifth control mode CM5 when the voltage command Vu* is lower than the zero voltage Vz. Also, the inverter circuit 40, when in the second operation mode, operates in the third control mode CM3 and fourth control mode CM4. That is, the inverter circuit 40 operates in the third control mode CM3 when the voltage command Vu* is equal to or higher than the zero voltage Vz, and operates in the fourth control mode CM4 when the voltage command Vu* is lower than the zero voltage Vz. Also, the inverter circuit 40, when in the third operation mode, operates in the seventh control mode CM7. Also, the inverter circuit 40, when in the fourth operation mode, operates in the first control mode CM1 and sixth control mode CM6. That is, the inverter circuit 40 operates in the first control mode CM1 when the voltage command Vu* is equal to or higher than the zero voltage Vz, and operates in the sixth control mode CM6 when the voltage command Vu* is lower than the zero voltage Vz.

Herein, the inverter circuit 40 carries out a control mode switching in each control mode. Also, when the inverter circuit 40 switches the operation mode, a control mode switching occurs. Further, the control mode switching is carried out at the timing at which a common arm which can conduct bidirectionally exists.

Figure 5:
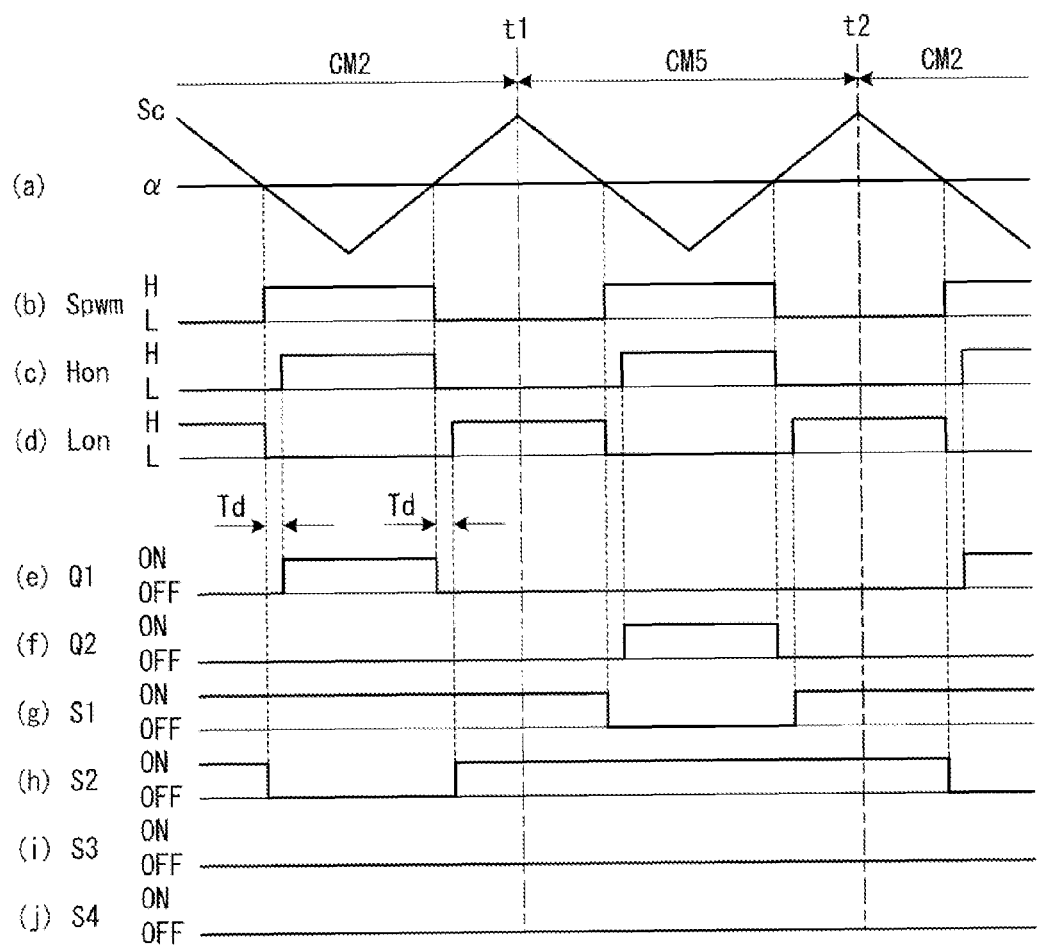
FIG. 5 is a diagram for illustrating a control mode switching example.

Firstly, a description will be given, referring to FIG. 5, of an operation wherein the inverter circuit 40, in the first operation mode, switches alternately between the second control mode CM2 and the fifth control mode CM5. At a timing t1, the inverter circuit 40 switches its operation from the second control mode CM2 to the fifth control mode CM5. Also, at a timing t2, the inverter circuit 40 switches its operation from the fifth control mode CM5 to the second control mode CM2. The timings t1 and t2 are timings at which the carrier signal Sc reaches the peak.

In the second control mode CM2, the switch element S1 is in an on state, and the switching element Q2 and the switch elements S3 and S4 are in an off state. Further, the switching element Q1 performs an on/off operation in accordance with the control signal Hon. Also, the switch element S2 performs an on/off operation in accordance with the control signal Lon.

Meanwhile, in the fifth control mode CM5, the switch element S2 is in an on state, and the switching element Q1 and the switch elements S3 and S4 are in an off state. Further, the switching element Q2 performs an on/off operation in accordance with the control signal Hon. Also, the switch element S1 performs an on/off operation in accordance with the control signal Lon.

Consequently, the switch elements S1 and S2 continue being in the on state before and after the timing t1. Therefore, even though the operation of the inverter circuit 40 switches from the second control mode CM2 to the fifth control mode CM5, a current flowing between the inverter circuit 40 and the load 6 continues flowing through one of the switch elements S1 and S2. Also, the switch elements S1 and S2 continue being in the on state before and after the timing t2. Therefore, even though the operation of the inverter circuit 40 switches from the fifth control mode CM5 to the second control mode CM2, the current flowing between the inverter circuit 40 and the load 6 continues flowing through one of the switch elements S1 and S2.

That is, the inverter circuit 40, in the first operation mode, carries out the control mode switching between the second control mode CM2 and the fifth control mode CM5 at the peak of the carrier signal Sc. By this control mode switching operation, the inverter circuit 40 can secure the path of a current flowing through the reactor Lf1. Consequently, the inverter circuit 40 can suppress a surge voltage appearing across the reactor Lf1 in the control mode switching in the first operation mode.

Figure 6:
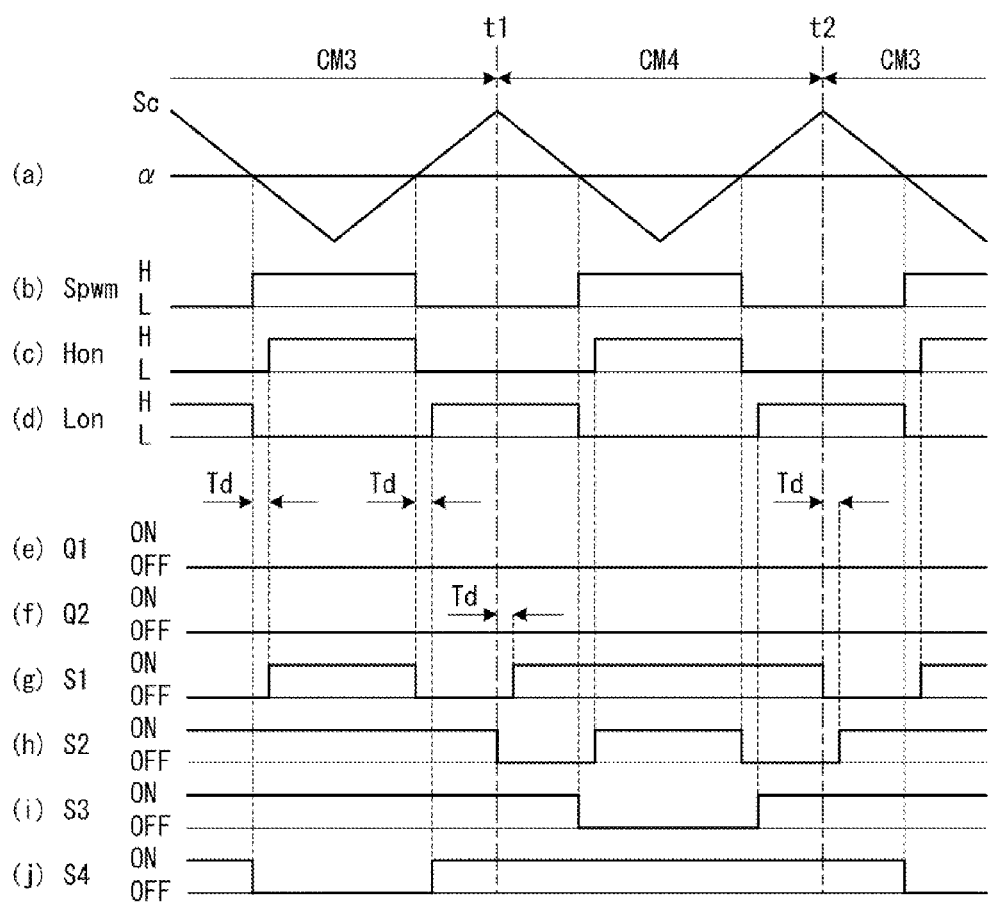
FIG. 6 is a diagram for illustrating another control mode switching example.

Next, a description will be given, referring to FIG. 6, of an operation wherein the inverter circuit 40, in the second operation mode, switches alternately between the third control mode CM3 and the fourth control mode CM4. At a timing t1, the inverter circuit 40 switches its operation from the third control mode CM3 to the fourth control mode CM4. Also, at a timing t2, the inverter circuit 40 switches its operation from the fourth control mode CM4 to the third control mode CM3. The timings t1 and t2 are timings at which the carrier signal Sc reaches the peak.

In the third control mode CM3, the switch elements S2 and S3 are in an on state, and the switching elements Q1 and Q2 are in an off state. Further, the switch element S1 performs an on/off operation in accordance with the control signal Hon. Also, the switch element S4 performs an on/off operation in accordance with the control signal Lon.

Meanwhile, in the fourth control mode CM4, the switch elements S1 and S4 are in an on state, and the switching elements Q1 and Q2 are in an off state. Further, the switch element S2 performs an on/off operation in accordance with the control signal Hon. Also, the switch element S3 performs an on/off operation in accordance with the control signal Lon.

Consequently, the switch elements S3 and S4 continue being in the on state before and after the timing t1. Therefore, even though the operation of the inverter circuit 40 switches from the third control mode CM3 to the fourth control mode CM4, a current flowing between the inverter circuit 40 and the load 6 continues flowing through one of the switch elements S3 and S4. Also, the switch elements S3 and S4 continue being in the on state before and after the timing t2. Therefore, even though the operation of the inverter circuit 40 switches from the fourth control mode CM4 to the third control mode CM3, the current flowing between the inverter circuit 40 and the load 6 continues flowing through one of the switch elements S3 and S4.

That is, the inverter circuit 40, in the second operation mode, carries out the control mode switching between the third control mode CM3 and the fourth control mode CM4 at the peak of the carrier signal Sc. By this control mode switching operation, the inverter circuit 40 can secure the path of a current flowing through the reactor Lf1. Consequently, the inverter circuit 40 can suppress a surge voltage appearing across the reactor Lf1 in the control mode switching in the second operation mode.

Figure 7:
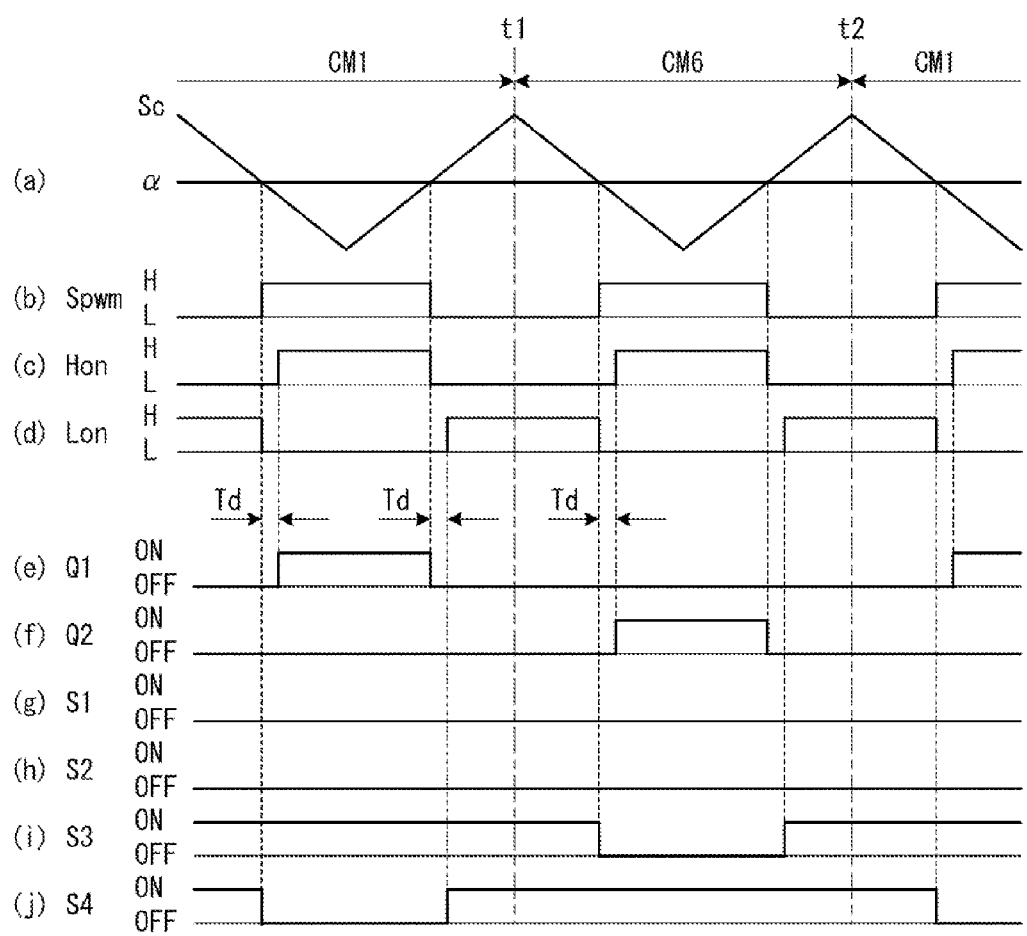
FIG. 7 is a diagram for illustrating another control mode switching example.

Next, a description will be given, referring to FIG. 7, of an operation wherein the inverter circuit 40, in the fourth operation mode, switches alternately between the first control mode CM1 and the sixth control mode CM6. At a timing t1, the inverter circuit 40 switches its operation from the first control mode CM1 to the sixth control mode CM6. Also, at a timing t2, the inverter circuit 40 switches its operation from the sixth control mode CM6 to the first control mode CM1. The timings t1 and t2 are timings at which the carrier signal Sc reaches the peak.

In the first control mode CM1, the switch element S3 is in an on state, and the switching element Q2 and the switch elements S1 and S2 are in an off state. Further, the switching element Q1 performs an on/off operation in accordance with the control signal Hon. Also, the switch element S4 performs an on/off operation in accordance with the control signal Lon.

Meanwhile, in the sixth control mode CM6, the switch element S4 is in an on state, and the switching element Q1 and the switch elements S1 and S2 are in an off state. Further, the switching element Q2 performs an on/off operation in accordance with the control signal Hon. Also, the switch element S3 performs an on/off operation in accordance with the control signal Lon.

Consequently, the switch elements S3 and S4 continue being in the on state before and after the timing t1. Therefore, even though the operation of the inverter circuit 40 switches from the first control mode CM1 to the sixth control mode CM6, a current flowing between the inverter circuit 40 and the load 6 continues flowing through one of the switch elements S3 and S4. Also, the switch elements S3 and S4 continue being in the on state before and after the timing t2. Therefore, even though the operation of the inverter circuit 40 switches from the sixth control mode CM6 to the first control mode CM1, the current flowing between the inverter circuit 40 and the load 6 continues flowing through one of the switch elements S3 and S4.

That is, the inverter circuit 40, in the fourth operation mode, carries out the control mode switching between the first control mode CM1 and the sixth control mode CM6 at the peak of the carrier signal Sc. By this control mode switching operation, the inverter circuit 40 can secure the path of a current flowing through the reactor Lf1. Consequently, the inverter circuit 40 can suppress a surge voltage appearing across the reactor Lf1 in the control mode switching in the fourth operation mode.

Figure 8:
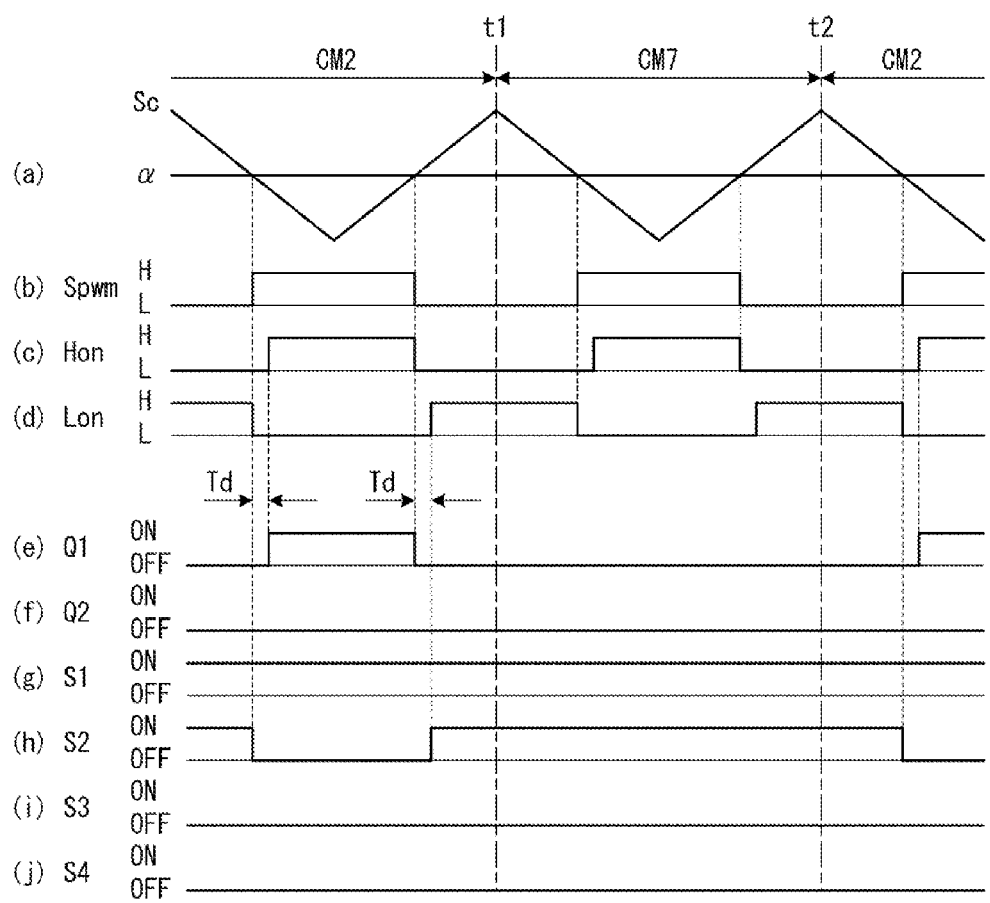
FIG. 8 is a diagram for illustrating another control mode switching example.

Next, a description will be given, referring to FIGS. 8 and 9, of an operation wherein the inverter circuit 40 switches alternately between the first operation mode and the third operation mode. FIG. 8 shows an operation of the inverter circuit 40 when the voltage command Vu* is equal to or higher than the zero voltage Vz. At a timing t1, the inverter circuit 40 switches its operation from the second control mode CM2 to the seventh control mode CM7. Also, at a timing t2, the inverter circuit 40 switches its operation from the seventh control mode CM7 to the second control mode CM2. The timings t1 and t2 are timings at which the carrier signal Sc reaches the peak.

In the second control mode CM2, the switch element S1 is in an on state, and the switching element Q2 and the switch elements S3 and S4 are in an off state. Further, the switching element Q1 performs an on/off operation in accordance with the control signal Hon. Also, the switch element S2 performs an on/off operation in accordance with the control signal Lon.

Meanwhile, in the seventh control mode CM7, the switch elements S1 and S2 are in an on state, and the switching elements Q1 and Q2 and the switch elements S3 and S4 are in an off state.

Consequently, the switch elements S1 and S2 continue being in the on state before and after the timing t1. Therefore, even though the operation of the inverter circuit 40 switches from the second control mode CM2 to the seventh control mode CM7, a current flowing between the inverter circuit 40 and the load 6 continues flowing through one of the switch elements S1 and S2. Also, the switch elements S1 and S2 continue being in the on state before and after the timing t2. Therefore, even though the operation of the inverter circuit 40 switches from the seventh control mode CM7 to the second control mode CM2, the current flowing between the inverter circuit 40 and the load 6 continues flowing through one of the switch elements S1 and S2.

Figure 9:
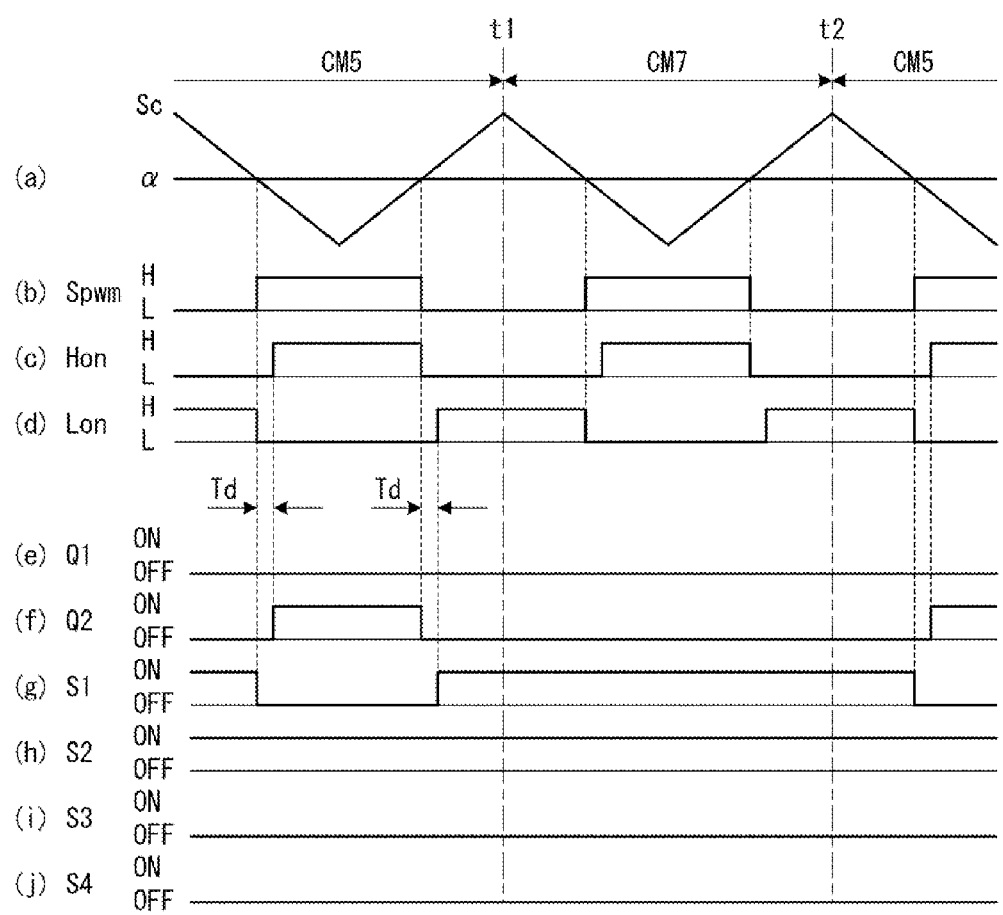
FIG. 9 is a diagram for illustrating another control mode switching example.

FIG. 9 shows an operation of the inverter circuit 40 when the voltage command Vu* is lower than the zero voltage Vz. At a timing t1, the inverter circuit 40 switches its operation from the fifth control mode CM5 to the seventh control mode CM7. Also, at a timing t2, the inverter circuit 40 switches its operation from the seventh control mode CM7 to the fifth control mode CM5. The timings t1 and t2 are timings at which the carrier signal Sc reaches the peak.

In the fifth control mode CM5, the switch element S2 is in an on state, and the switching element Q1 and the switch elements S3 and S4 are in an off state. Further, the switching element Q2 performs an on/off operation in accordance with the control signal Hon. Also, the switch element S1 performs an on/off operation in accordance with the control signal Lon.

Meanwhile, in the seventh control mode CM7, the switch elements S1 and S2 are in an on state, and the switching elements Q1 and Q2 and the switch elements S3 and S4 are in an off state.

Consequently, the switch elements S1 and S2 continue being in the on state before and after the timing t1. Therefore, even though the operation of the inverter circuit 40 switches from the fifth control mode CM5 to the seventh control mode CM7, a current flowing between the inverter circuit 40 and the load 6 continues flowing through one of the switch elements S1 and S2. Also, the switch elements S1 and S2 continue being in the on state before and after the timing t2. Therefore, even though the operation of the inverter circuit 40 switches from the seventh control mode CM7 to the fifth control mode CM5, the current flowing between the inverter circuit 40 and the load 6 continues flowing through one of the switch elements S1 and S2.

That is, the inverter circuit 40 carries out the operation mode switching between the first operation mode and the third operation mode by carrying out the control mode switching at the peak of the carrier signal Sc. By this control mode switching operation, the inverter circuit 40 can secure the path of a current flowing through the reactor Lf1. Consequently, the inverter circuit 40 can suppress a surge voltage appearing across the reactor Lf1 in the operation mode switching between the first operation mode and the third operation mode.

Figure 10:
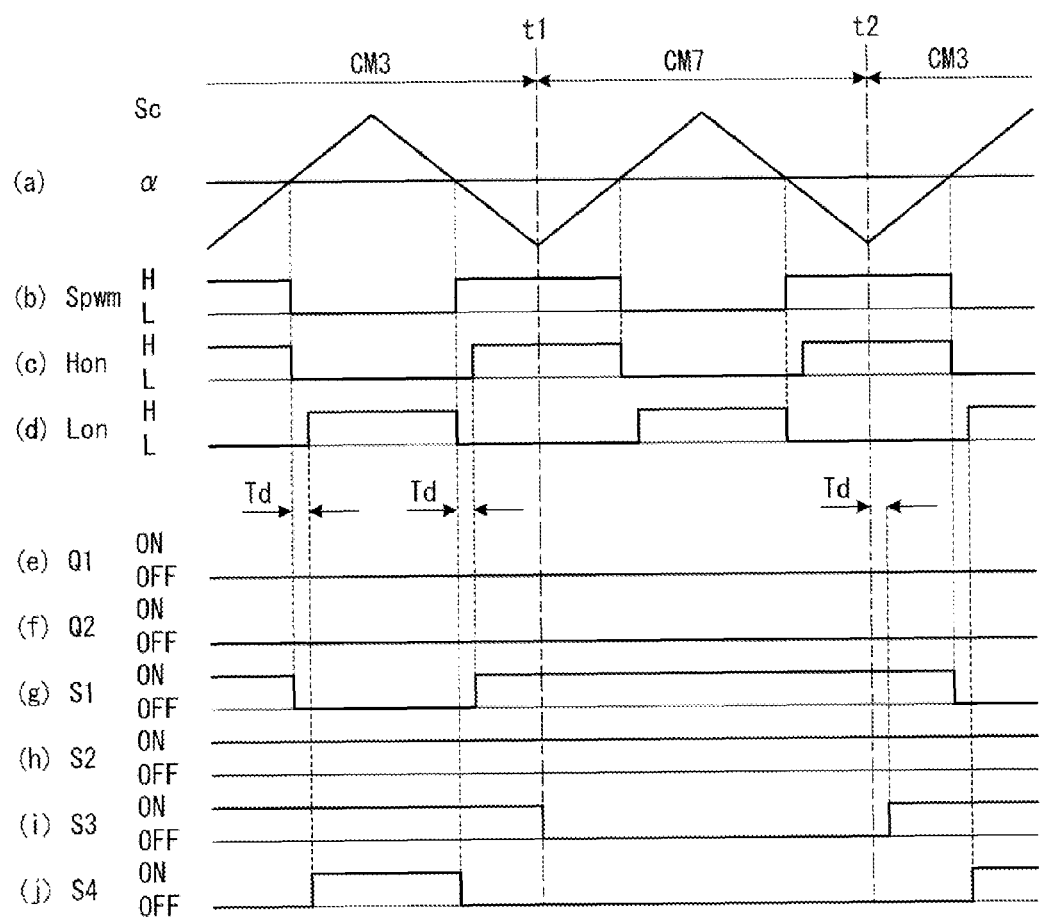
FIG. 10 is a diagram for illustrating another control mode switching example.

Next, a description will be given, referring to FIGS. 10 and 11, of an operation wherein the inverter circuit 40 switches alternately between the second operation mode and the third operation mode. FIG. 10 shows an operation of the inverter circuit 40 when the voltage command Vu* is equal to or higher than the zero voltage Vz. At a timing t1, the inverter circuit 40 switches its operation from the third control mode CM3 to the seventh control mode CM7. Also, at a timing t2, the inverter circuit 40 switches its operation from the seventh control mode CM7 to the third control mode CM3. The timings t1 and t2 are timings at which the carrier signal Sc reaches the trough.

In the third control mode CM3, the switch elements S2 and S3 are in an on state, and the switching elements Q1 and Q2 are in an off state. Further, the switch element S4 performs an on/off operation in accordance with the control signal Hon. Also, the switch element S1 performs an on/off operation in accordance with the control signal Lon.

Meanwhile, in the seventh control mode CM7, the switch elements S1 and S2 are in an on state, and the switching elements Q1 and Q2 and the switch elements S3 and S4 are in an off state.

Consequently, at the timing t1, the switch element S3 is turned off, but the switch elements S1 and S2 are in the on state. Further, the switch elements S1 and S2 continue being in the on state before and after the timing t1. Therefore, even though the operation of the inverter circuit 40 switches from the third control mode CM3 to the seventh control mode CM7, a current flowing between the inverter circuit 40 and the load 6 continues flowing through one of the switch elements S1 and S2. Also, the switch elements S1 and S2 continue being in the on state before and after the timing t2. Therefore, even though the operation of the inverter circuit 40 switches from the seventh control mode CM7 to the third control mode CM3, the current flowing between the inverter circuit 40 and the load 6 continues flowing through one of the switch elements S1 and S2.

Figure 11:
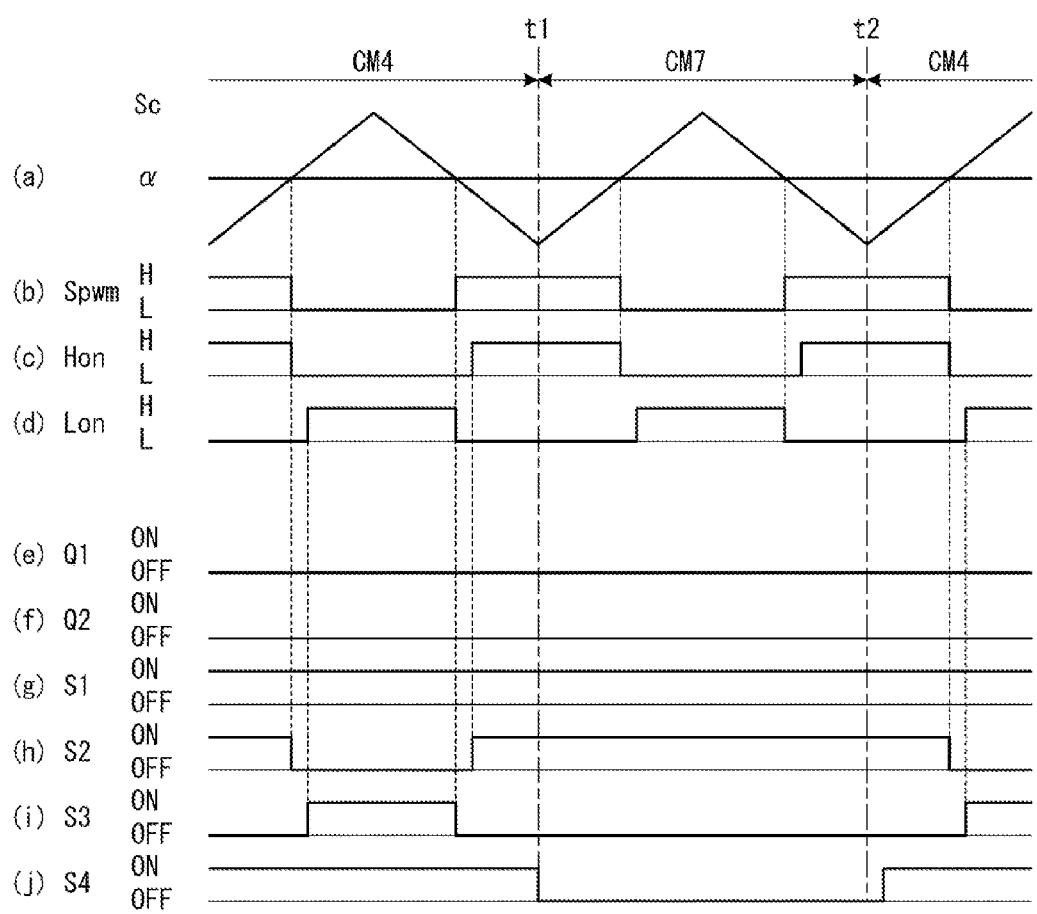
FIG. 11 is a diagram for illustrating another control mode switching example.

FIG. 11 shows an operation of the inverter circuit 40 when the voltage command Vu* is lower than the zero voltage Vz. At a timing t1, the inverter circuit 40 switches its operation from the fourth control mode CM4 to the seventh control mode CM7. Also, at a timing t2, the inverter circuit 40 switches its operation from the seventh control mode CM7 to the fourth control mode CM4. The timings t1 and t2 are timings at which the carrier signal Sc reaches the trough.

In the fourth control mode CM4, the switch elements S1 and S4 are in an on state, and the switching elements Q1 and Q2 are in an off state. Further, the switch element S3 performs an on/off operation in accordance with the control signal Hon. Also, the switch element S2 performs an on/off operation in accordance with the control signal Lon.

Meanwhile, in the seventh control mode CM7, the switch elements S1 and S2 are in an on state, and the switching elements Q1 and Q2 and the switch elements S3 and S4 are in an off state.

Consequently, at the timing t1, the switch element S4 is turned off, but the switch elements S1 and S2 are in the on state. Further, the switch elements S1 and S2 continue being in the on state before and after the timing t1. Therefore, even though the operation of the inverter circuit 40 switches from the fourth control mode CM4 to the seventh control mode CM7, a current flowing between the inverter circuit 40 and the load 6 continues flowing through one of the switch elements S1 and S2. Also, the switch elements S1 and S2 continue being in the on state before and after the timing t2. Therefore, even though the operation of the inverter circuit 40 switches from the seventh control mode CM7 to the fourth control mode CM4, the current flowing between the inverter circuit 40 and the load 6 continues flowing through one of the switch elements S1 and S2.

That is, the inverter circuit 40 carries out the operation mode switching between the second operation mode and the third operation mode by carrying out the control mode switching at the trough of the carrier signal Sc. By this control mode switching operation, the inverter circuit 40 can secure the path of a current flowing through the reactor Lf1. Consequently, the inverter circuit 40 can suppress a surge voltage appearing across the reactor Lf1 in the operation mode switching between the second operation mode and the third operation mode.

Figure 12:
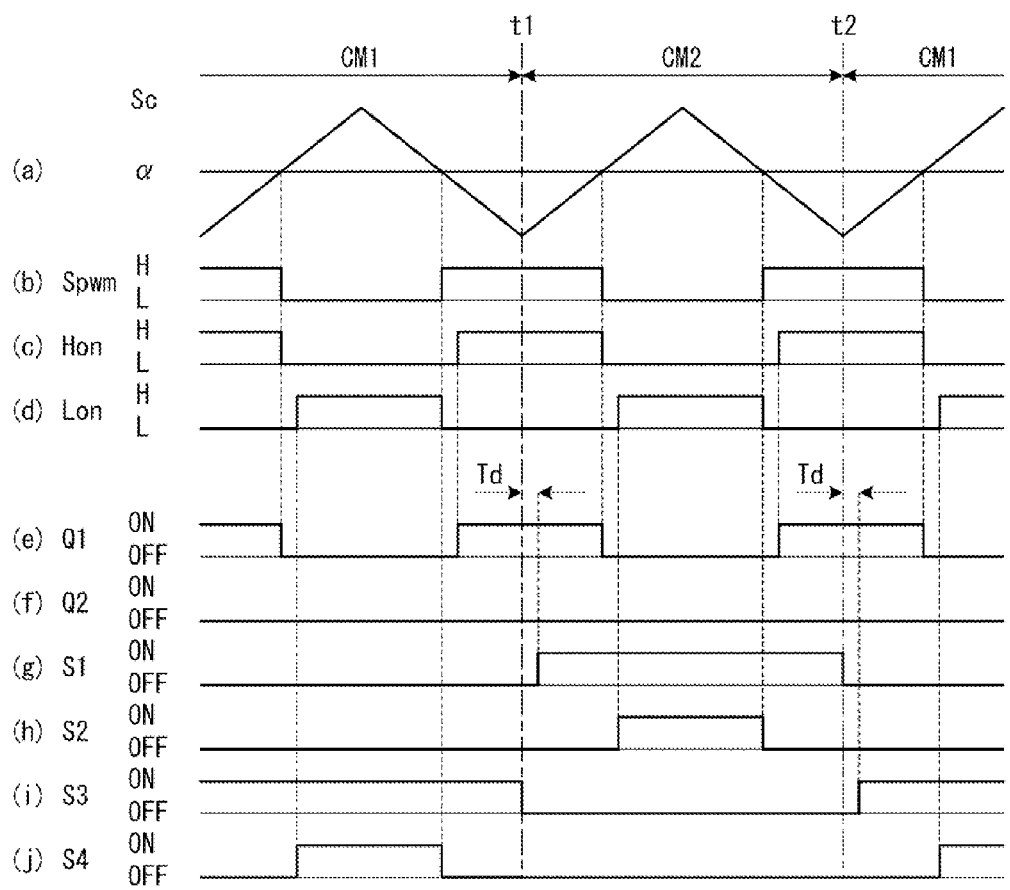
FIG. 12 is a diagram for illustrating another control mode switching example.

Next, a description will be given, referring to FIGS. 12 and 13, of an operation wherein the inverter circuit 40 switches alternately between the first operation mode and the fourth operation mode. FIG. 12 shows an operation of the inverter circuit 40 when the voltage command Vu* is equal to or higher than the zero voltage Vz. At a timing t1, the inverter circuit 40 switches its operation from the first control mode CM1 to the second control mode CM2. Also, at a timing t2, the inverter circuit 40 switches its operation from the second control mode CM2 to the first control mode CM1. The timings t1 and t2 are timings at which the carrier signal Sc reaches the trough.

In the first control mode CM1, the switch element S3 is in an on state, and the switching element Q2 and the switch elements S1 and S2 are in an off state. Further, the switch element S4 performs an on/off operation in accordance with the control signal Hon. Also, the switching element Q1 performs an on/off operation in accordance with the control signal Lon.

Meanwhile, in the second control mode CM2, the switch element S1 is in an on state, and the switching element Q2 and the switch elements S3 and S4 are in an off state. Further, the switch element S2 performs an on/off operation in accordance with the control signal Hon. Also, the switching element Q1 performs an on/off operation in accordance with the control signal Lon.

Consequently, at the timing t1, the switch element S3 is turned off. However, the switching element Q1 continues being in the on state before and after the timing t1. Therefore, even though the operation of the inverter circuit 40 switches from the first control mode CM1 to the second control mode CM2, a current flowing between the inverter circuit 40 and the load 6 continues flowing through one of the switching element Q1 or the diode connected in reverse parallel thereto. Also, the switching element Q1 continues being in the on state before and after the timing t2. Therefore, even though the operation of the inverter circuit 40 switches from the second control mode CM2 to the first control mode CM1, the current flowing between the inverter circuit 40 and the load 6 continues flowing through one of the switching element Q1 or the diode connected in reverse parallel thereto.

Figure 13:
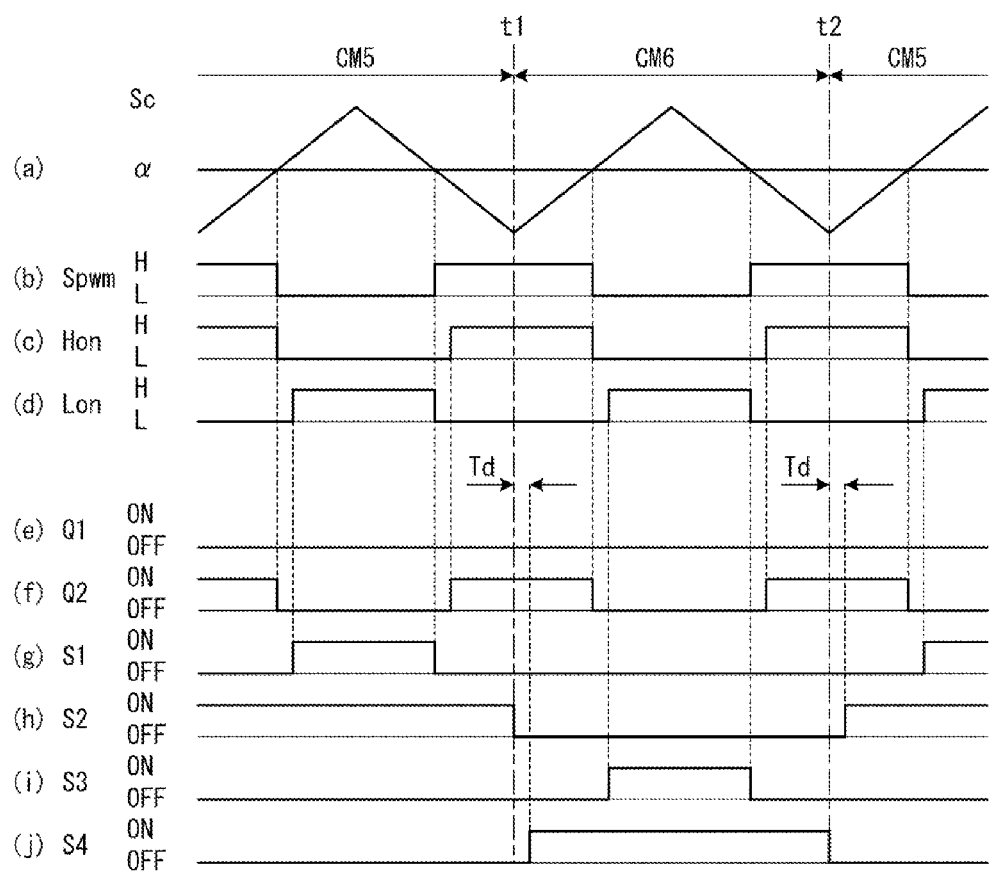
FIG. 13 is a diagram for illustrating another control mode switching example.

FIG. 13 shows an operation of the inverter circuit 40 when the voltage command Vu* is lower than the zero voltage Vz. At a timing t1, the inverter circuit 40 switches its operation from the fifth control mode CM5 to the sixth control mode CM6. Also, at a timing t2, the inverter circuit 40 switches its operation from the sixth control mode CM6 to the fifth control mode CM5. The timings t1 and t2 are timings at which the carrier signal Sc reaches the trough.

In the fifth control mode CM5, the switch element S2 is in an on state, and the switching element Q1 and the switch elements S3 and S4 are in an off state. Further, the switch element S1 performs an on/off operation in accordance with the control signal Hon. Also, the switching element Q2 performs an on/off operation in accordance with the control signal Lon.

Meanwhile, in the sixth control mode CM6, the switch element S4 is in an on state, and the switching element Q1 and the switch elements S1 and S2 are in an off state. Further, the switch element S3 performs an on/off operation in accordance with the control signal Hon. Also, the switching element Q2 performs an on/off operation in accordance with the control signal Lon.

Consequently, at the timing t1, the switch element S2 is turned off. However, the switching element Q2 continues being in the on state before and after the timing t1. Therefore, even though the operation of the inverter circuit 40 switches from the fifth control mode CM5 to the sixth control mode CM6, a current flowing between the inverter circuit 40 and the load 6 continues flowing through one of the switching element Q2 or the diode connected in reverse parallel thereto.

Also, the switching element Q2 continues being in the on state before and after the timing t2. Therefore, even though the operation of the inverter circuit 40 switches from the sixth control mode CM6 to the fifth control mode CM5, the current flowing between the inverter circuit 40 and the load 6 continues flowing through one of the switching element Q2 or the diode connected in reverse parallel thereto.

That is, the inverter circuit 40 carries out the operation mode switching between the first operation mode and the fourth operation mode by carrying out the control mode switching at the trough of the carrier signal Sc. By this control mode switching operation, the inverter circuit 40 can secure the path of a current flowing through the reactor Lf1. Consequently, the inverter circuit 40 can suppress a surge voltage appearing across the reactor Lf1 in the operation mode switching between the first operation mode and the fourth operation mode.

Figure 14:
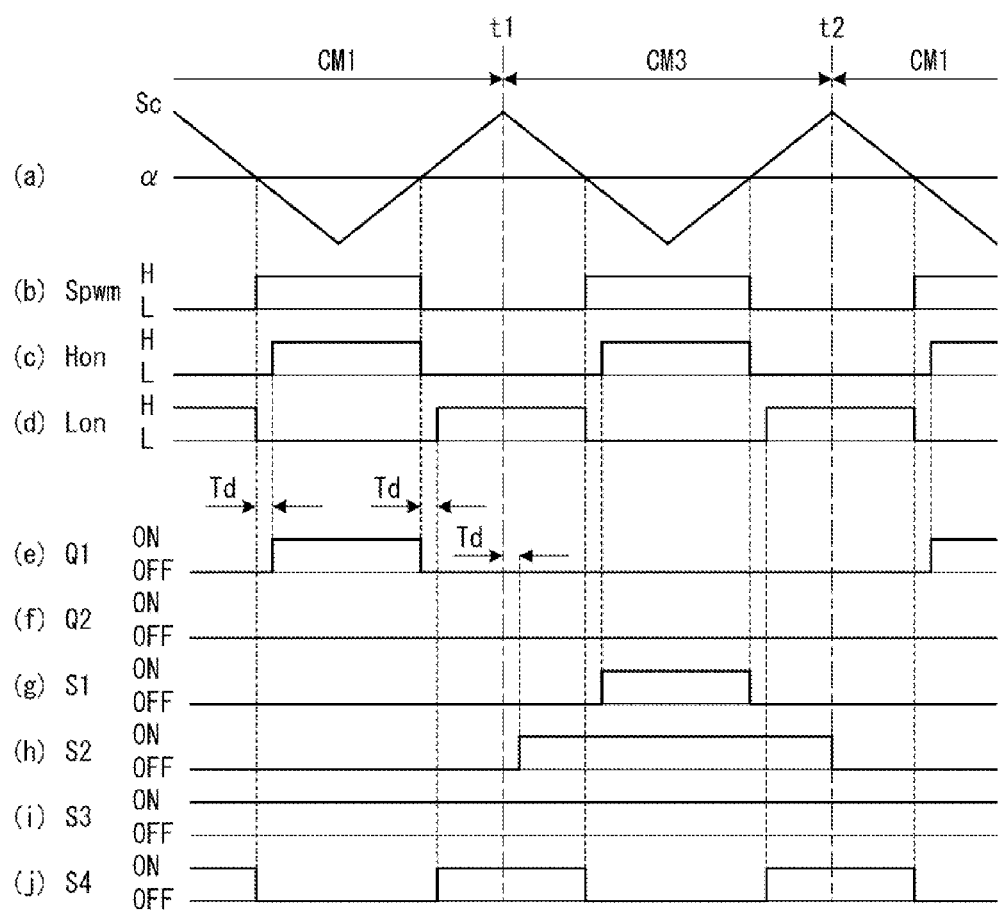
FIG. 14 is a diagram for illustrating another control mode switching example.

Next, a description will be given, referring to FIGS. 14 to 17, of an operation wherein the inverter circuit 40 switches alternately between the second operation mode and the fourth operation mode. FIG. 14 shows an operation of the inverter circuit 40 when the voltage command Vu* is equal to or higher than the zero voltage Vz. At a timing t1, the inverter circuit 40 switches its operation from the first control mode CM1 to the third control mode CM3. Also, at a timing t2, the inverter circuit 40 switches its operation from the third control mode CM3 to the first control mode CM1. The timings t1 and t2 are timings at which the carrier signal Sc reaches the peak.

In the first control mode CM1, the switch element S3 is in an on state, and the switching element Q2 and the switch elements S1 and S2 are in an off state. Further, the switch element S4 performs an on/off operation in accordance with the control signal Hon. Also, the switching element Q1 performs an on/off operation in accordance with the control signal Lon.

Meanwhile, in the third control mode CM3, the switch elements S2 and S3 are in an on state, and the switching elements Q1 and Q2 are in an off state. Further, the switch element S1 performs an on/off operation in accordance with the control signal Hon. Also, the switch element S4 performs an on/off operation in accordance with the control signal Lon.

Consequently, the switch elements S3 and S4 continue being in the on state before and after the timing t1. Therefore, even though the operation of the inverter circuit 40 switches from the first control mode CM1 to the third control mode CM3, a current flowing between the inverter circuit 40 and the load 6 continues flowing through one of the switch elements S3 and S4. Also, the switch elements S3 and S4 continue being in the on state before and after the timing t2. Therefore, even though the operation of the inverter circuit 40 switches from the third control mode CM3 to the first control mode CM1, the current flowing between the inverter circuit 40 and the load 6 continues flowing through one of the switch element S3 and S4.

Figure 15:
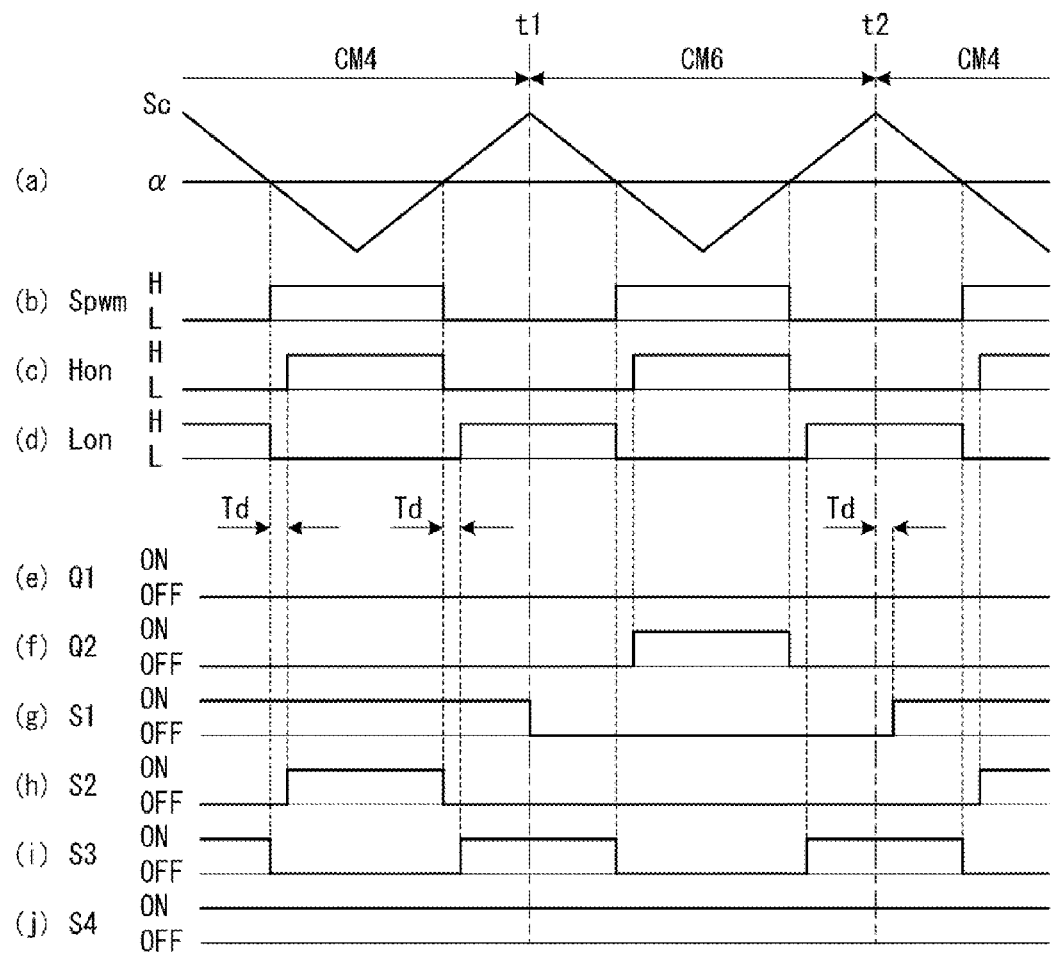
FIG. 15 is a diagram for illustrating another control mode switching example.

FIG. 15 shows an operation of the inverter circuit 40 when the voltage command Vu* is lower than the zero voltage Vz. At a timing t1, the inverter circuit 40 switches its operation from the fourth control mode CM4 to the sixth control mode CM6. Also, at a timing t2, the inverter circuit 40 switches its operation from the sixth control mode CM6 to the fourth control mode CM4. The timings t1 and t2 are timings at which the carrier signal Sc reaches the peak.

In the fourth control mode CM4, the switch elements S1 and S4 are in an on state, and the switching elements Q1 and Q2 are in an off state. Further, the switch element S2 performs an on/off operation in accordance with the control signal Hon. Also, the switch element S3 performs an on/off operation in accordance with the control signal Lon.

Meanwhile, in the sixth control mode CM6, the switch element S4 is in an on state, and the switching element Q1 and the switch elements S1 and S2 are in an off state. Further, the switching element Q2 performs an on/off operation in accordance with the control signal Hon. Also, the switch element S3 performs an on/off operation in accordance with the control signal Lon.

Consequently, the switch elements S3 and S4 continue being in the on state before and after the timing t1. Therefore, even though the operation of the inverter circuit 40 switches from the fourth control mode CM4 to the sixth control mode CM6, a current flowing between the inverter circuit 40 and the load 6 continues flowing through one of the switch elements S3 and S4. Also, the switch elements S3 and S4 continue being in the on state before and after the timing t2. Therefore, even though the operation of the inverter circuit 40 switches from the sixth control mode CM6 to the fourth control mode CM4, the current flowing between the inverter circuit 40 and the load 6 continues flowing through one of the switch element S3 and S4.

Figure 16:
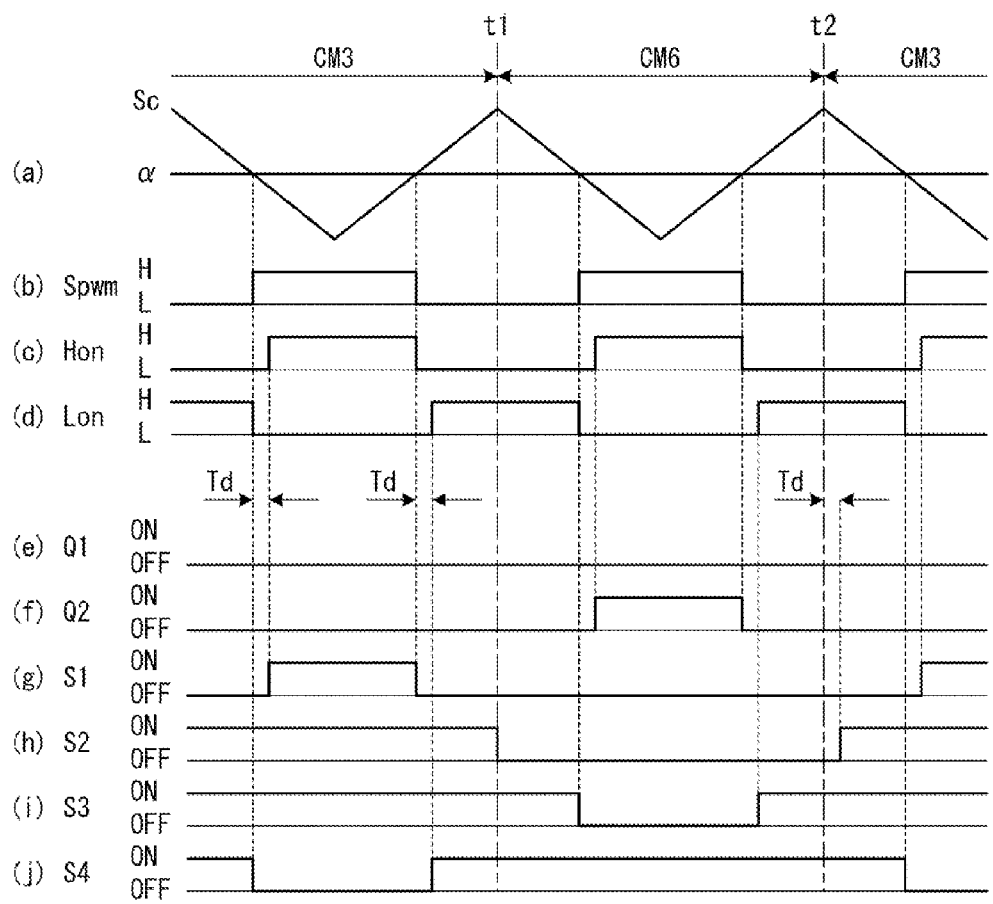
FIG. 16 is a diagram for illustrating another control mode switching example.

FIG. 16 shows an operation of the inverter circuit 40 when the voltage command Vu* switches from the positive polarity to the negative polarity. At a timing t1, the operation of the inverter circuit 40 switches from the third control mode CM3 to the sixth control mode CM6. Also, at a timing t2, the operation of the inverter circuit 40 switches from the sixth control mode CM6 to the third control mode CM3. The timings t1 and t2 are timings at which the carrier signal Sc reaches the peak.

In the third control mode CM3, the switch elements S2 and S3 are in an on state, and the switching elements Q1 and Q2 are in an off state. Further, the switch element S1 performs an on/off operation in accordance with the control signal Hon. Also, the switch element S4 performs an on/off operation in accordance with the control signal Lon.

Meanwhile, in the sixth control mode CM6, the switch element S4 is in an on state, and the switching element Q1 and the switch elements S1 and S2 are in an off state. Further, the switching element Q2 performs an on/off operation in accordance with the control signal Hon. Also, the switch element S3 performs an on/off operation in accordance with the control signal Lon.

Consequently, the switch elements S3 and S4 continue being in the on state before and after the timing t1. Therefore, even though the operation of the inverter circuit 40 switches from the third control mode CM3 to the sixth control mode CM6, a current flowing between the inverter circuit 40 and the load 6 continues flowing through one of the switch elements S3 and S4. Also, the switch elements S3 and S4 continue being in the on state before and after the timing t2. Therefore, even though the operation of the inverter circuit 40 switches from the sixth control mode CM6 to the third control mode CM3, the current flowing between the inverter circuit 40 and the load 6 continues flowing through one of the switch element S3 and S4.

Figure 17:
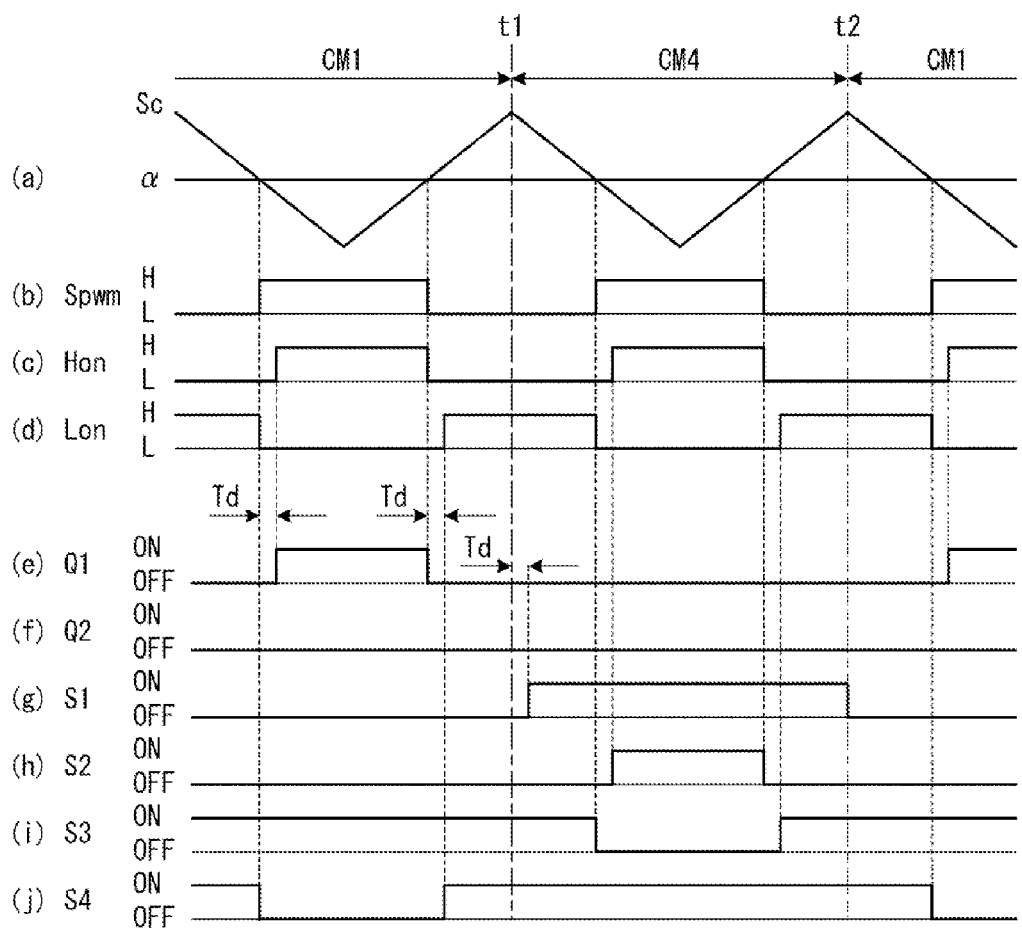
FIG. 17 is a diagram for illustrating another control mode switching example.

FIG. 17 shows an operation of the inverter circuit 40 when the voltage command Vu* switches from the positive polarity to the negative polarity. At a timing t1, the operation of the inverter circuit 40 switches from the first control mode CM1 to the fourth control mode CM4. Also, at a timing t2, the operation of the inverter circuit 40 switches from the fourth control mode CM4 to the first control mode CM1. The timings t1 and t2 are timings at which the carrier signal Sc reaches the peak.

In the first control mode CM1, the switch element S3 is in an on state, and the switching element Q2 and the switch elements S1 and S2 are in an off state. Further, the switching element Q1 performs an on/off operation in accordance with the control signal Hon. Also, the switch element S4 performs an on/off operation in accordance with the control signal Lon.

Meanwhile, in the fourth control mode CM4, the switch elements S1 and S4 are in an on state, and the switching elements Q1 and Q2 are in an off state. Further, the switch element S2 performs an on/off operation in accordance with the control signal Hon. Also, the switch element S3 performs an on/off operation in accordance with the control signal Lon.

Consequently, the switch elements S3 and S4 continue being in the on state before and after the timing t1. Therefore, even though the operation of the inverter circuit 40 switches from the first control mode CM1 to the fourth control mode CM4, a current flowing between the inverter circuit 40 and the load 6 continues flowing through one of the switch elements S3 and S4. Also, the switch elements S3 and S4 continue being in the on state before and after the timing t2. Therefore, even though the operation of the inverter circuit 40 switches from the fourth control mode CM4 to the first control mode CM1, the current flowing between the inverter circuit 40 and the load 6 continues flowing through one of the switch elements S3 and S4.

That is, the inverter circuit 40 carries out the operation mode switching between the second operation mode and the fourth operation mode by carrying out the control mode switching at the peak of the carrier signal Sc. By this control mode switching operation, the inverter circuit 40 can secure the path of a current flowing through the reactor Lf1. Consequently, the inverter circuit 40 can suppress a surge voltage appearing across the reactor Lf1 in the operation mode switching between the second operation mode and the fourth operation mode.

A description has heretofore been given of the invention with a power converter including four arms taken as an example, but, the invention can also be applied to a power converter including five or more arms.

INDUSTRIAL APPLICABILITY

The invention can be applied to a device, such as an instantaneous voltage drop compensation device or an uninterruptible power supply device, for supplying a stable voltage to a load even though a voltage fluctuation of an alternating current power source and an interruption of the alternating current power source occur.

REFERENCE SIGNS LIST

1 Alternating current power source
2 Capacitor
3, 30 Direct current power source circuit
4, 40 Inverter circuit
5 Filter circuit
6 Load
100 Control circuit

What is claimed is:

1. A power conversion device, comprising:
a power converter which has:
first to fourth input terminals;
a first output terminal;
a second output terminal connected to the fourth input terminal; and
first to fourth arms connected between the respective first to fourth input terminals and the first output terminal, and which, using voltages input from the first to fourth input terminals, outputs an alternating current voltage between the first and second output terminals, wherein
the power converter operates in a control mode which alternately turns on and off two arms selected from among the first to fourth arms,
the power converter has two or more of the control modes set by combining different arms, and
the power converter, when switching operation from one control mode to another control mode, carries out the control mode switching at a timing at which at least one common arm continues a bidirectionally conductible condition before and after the switching;
wherein the two or more control modes include outputting a voltage of a selected polarity using a selected one of combinations of at least one of a direct current voltage or an alternating current voltage.

2. The power conversion device according to claim 1, wherein
a first direct current voltage is input between the first input terminal and the fourth input terminal,
a second direct current voltage is input between the second input terminal and the fourth input terminal,
an alternating current voltage is input between the third input terminal and the fourth input terminal, and
a size of the first and second direct current voltages is larger than an amplitude of the alternating current voltage.

3. The power conversion device according to claim 2, wherein
the first arm includes a first switching element and a first diode connected in reverse parallel thereto,
the second arm includes a second switching element and a second diode connected in reverse parallel thereto,
the third arm includes a first switch element and a second switch element connected in reverse parallel thereto, and
the fourth arm includes a third switch element and a fourth switch element connected in reverse parallel thereto.

4. The power conversion device according to claim 3, wherein
the control modes which the power converter has include first to seventh control modes, and
the first control mode is a control mode in which to output a positive voltage between the first and second output terminals using the first direct current voltage,
the second control mode is a control mode in which to output a positive voltage between the first and second output terminals using the alternating current voltage and the first direct current voltage,
the third control mode is a control mode in which to output a positive voltage between the first and second output terminals using the alternating current voltage,
the fourth control mode is a control mode in which to output a negative voltage between the first and second output terminals using the alternating current voltage,
the fifth control mode is a control mode in which to output a negative voltage between the first and second output terminals using the alternating current voltage and the first direct current voltage,
the sixth control mode is a control mode in which to output a negative voltage between the first and second output terminals using the second direct current voltage, and
the seventh control mode is a control mode in which to output the alternating current voltage between the first and second output terminals.

5. The power conversion device according to claim 4, wherein
when the third and fourth switch elements are turned on, the power converter carries out the control mode switching between the first and sixth control modes.

6. The power conversion device according to claim 4, wherein
when the first and second switch elements are turned on, the power converter carries out the control mode switching between the second and fifth control modes.

7. The power conversion device according to claim 5, wherein
when the first and second switch elements are turned on, the power converter carries out the control mode switching between the third and fourth control modes.

8. The power conversion device according to claim 4, wherein
when the first and second switch elements are turned on, the power converter carries out the control mode switching between the seventh control mode and one of the second to fifth control modes.

9. The power conversion device according to claim 4, wherein
when the first switching element is turned on, the power converter carries out the control mode switching between the first control mode and the second control mode.

10. The power conversion device according to claim 4, wherein
when the second switching element is turned on, the power converter carries out the control mode switching between the fifth control mode and the sixth control mode.

11. The power conversion device according to claim 4, wherein
when the third and fourth switch elements are turned on, the power converter carries out the control mode switching between the third control mode and one of the first or sixth control modes.

12. The power conversion device according to claim 4, wherein
when the third and fourth switch elements are turned on, the power converter carries out the control mode switching between the fourth control mode and one of the first or sixth control modes.

13. The power conversion device according to claim 4, further comprising a control circuit, wherein
the power converter outputs a voltage based on a pulse-width modulated signal between the first and second output terminals, that
the control circuit includes:
a voltage command generation circuit for generating a command for a voltage to be output by the power converter;
a control mode setting circuit for generating a control mode signal indicating which of the first to seventh control modes the control mode of the power converter is;
a pulse width modulation circuit for generating the pulse-width modulated signal using a modulation signal and a carrier signal;
a modulation signal generation circuit for generating the modulation signal; and
a carrier signal generation circuit for generating the carrier signal;
a pulse distribution circuit for generating a control signal of the switching elements and the switch elements, and the voltage command generation circuit, based on, at least, the alternating current voltage, generates the command for the voltage to be output by the power converter,
the control mode setting circuit generates the control mode signal based on, at least, the command for the voltage to be output by the power converter and the alternating current voltage,
the modulation signal generation circuit generates the modulation signal based on, at least, the control mode signal, the command for the voltage to be output by the power converter, the alternating current voltage, and the first and second direct current voltages,
the pulse width modulation circuit generates the pulse-width modulated signal based on, at least, the modulation signal and the carrier signal, and
the pulse distribution circuit, based on, at least, the control mode signal and the pulse-width modulated signal, generates a control signal for controlling the turning on and off of the first and second switching elements and first to fourth switch elements.

14. A power conversion device, comprising:
a power converter which has:
N (N is an integer of four or greater) input terminals;
first and second output terminals; and
N arms connected between the respective N input terminals and the first output terminal, and which, using voltages input from the N input terminals, outputs an alternating current voltage between the first and second output terminals, wherein
the power converter operates in a control mode in which to alternately turn on and off two arms selected from among the N arms,
the power converter includes two or more of the control modes set by combining different arms, and
the power converter, when switching operation from one control mode to another control mode, carries out the control mode switching at a timing at which at least one common arm continues a bidirectionally conductible condition before and after the switching;
wherein the two or more control modes include outputting a voltage of a selected polarity using a selected one of combinations of at least one of a direct current voltage or an alternating current voltage.

15. The power conversion device according to claim 14, wherein
one input terminal, of the N input terminals, is connected to the second output terminal.

16. The power conversion device according to claim 15, wherein
one arm, of the N arms, is connected between the first and second output terminals,
the one arm includes a bidirectional switch which can control bidirectional conduction,
an arm, of the N arms, which inputs an alternating current voltage includes a bidirectional switch which can control bidirectional conduction, and
an arm, of the N arms, which inputs a direct current voltage includes a switch element which can control the conduction in a direction from the input terminal toward the first output terminal.

17. An apparatus, comprising:
a power conversion device configured to supply an alternating voltage to a load, the power conversion device including a first circuit, a second circuit, a third circuit and a fourth circuit; and
a control circuit configured to change operating modes of the power conversion device by turning on and turning off selected ones of the first circuit, the second circuit, the third circuit and the fourth circuit;

wherein the power conversion device is configured to enable bidirectional conduction in at least one of the first circuit, the second circuit, the third circuit or the fourth circuit during a change in the operating mode; and wherein the operating modes include outputting a voltage of a selected polarity using a selected one of combinations of at least one of a direct current voltage or an alternating current voltage.

18. The apparatus of claim 17, wherein the first circuit and the second circuit each include a switch connected in parallel to a diode.

19. The apparatus of claim 17, wherein the third circuit and the fourth circuit each include a switch connected in parallel to another switch.

20. The apparatus of claim 17, wherein the control circuit is configured to output control signals to change the operating modes based on combinations of voltages at selected nodes of the first circuit, the second circuit, the third circuit and the fourth circuit.

* * * * *